US012163336B2

(12) United States Patent
Maurer et al.

(10) Patent No.: US 12,163,336 B2
(45) Date of Patent: Dec. 10, 2024

(54) MOUNTING BLOCK FOR VINYL SIDING

(71) Applicant: Pontiac Trail Products, LLC, Novi, MI (US)

(72) Inventors: Michael W. Maurer, Novi, MI (US); Christopher David Meeks, Greensboro, NC (US)

(73) Assignee: Pontiac Trail Products, LLC, Novi, MI (US)

( * ) Notice: Subject to any disclaimer, the term of this patent is extended or adjusted under 35 U.S.C. 154(b) by 181 days.

(21) Appl. No.: 18/063,759

(22) Filed: Dec. 9, 2022

(65) Prior Publication Data

US 2023/0183982 A1 Jun. 15, 2023

Related U.S. Application Data

(60) Provisional application No. 63/287,728, filed on Dec. 9, 2021.

(51) Int. Cl.
*E04F 13/074* (2006.01)
*E04F 13/076* (2006.01)

(52) U.S. Cl.
CPC .......... *E04F 13/074* (2013.01); *E04F 13/076* (2013.01)

(58) Field of Classification Search
CPC .......... F21S 8/033; F21S 8/036; F21V 21/02; E04C 1/39; E04C 1/392; E04C 1/397; E04F 13/074; F24F 17/02; F24F 13/20; F24F 13/082; E04D 13/174; E04D 13/17
See application file for complete search history.

(56) References Cited

U.S. PATENT DOCUMENTS

| | | | | |
|---|---|---|---|---|
| 3,495,276 A | * | 2/1970 | Suess | D06F 39/088 |
| | | | | 220/477 |
| 4,922,056 A | * | 5/1990 | Larsson | H02G 3/16 |
| | | | | 174/650 |
| 5,326,060 A | * | 7/1994 | Chubb | F21V 21/02 |
| | | | | 52/220.8 |
| 5,918,431 A | * | 7/1999 | Schiedegger | E04C 1/392 |
| | | | | 52/220.1 |
| 6,419,102 B1 | * | 7/2002 | Harpenau | D06F 58/20 |
| | | | | 220/3.3 |
| 6,550,157 B1 | * | 4/2003 | Harding | D06F 58/20 |
| | | | | 34/235 |
| 6,723,921 B2 | * | 4/2004 | Vagedes | H02G 3/123 |
| | | | | 439/535 |

(Continued)

*Primary Examiner* — Kyle J. Walraed-Sullivan
(74) *Attorney, Agent, or Firm* — Quinn IP Law

(57) ABSTRACT

An improved mounting block has a base plate portion and a face plate portion. Base plate portion has an outer surface extending outward from a mounting surface and is selectively attachable to the face plate portion. One of the face plate portion and the base plate portion has a plurality of snap fit teeth formed thereon, and the other has a plurality of snap fit receivers, configured to selectively receive the snap fit teeth. Face plate portion may include flange flex grooves formed in an attachment flange, allowing walls to deflect independently from corners, such that the flange flex grooves allow the attachment flange to flex outward from the outer surface. Base plate portion may include alignment ribs extending outward from the outer surface, such that the flange flex grooves formed in the attachment flange interface with the alignment ribs formed on the base plate portion.

11 Claims, 24 Drawing Sheets

(56) References Cited

U.S. PATENT DOCUMENTS

| | | | | |
|---|---|---|---|---|
| 6,825,414 B2* | 11/2004 | Vagedes | ............... | H02G 3/123 |
| | | | | 439/535 |
| 7,563,980 B2* | 7/2009 | Wimberly | ............... | H02G 3/14 |
| | | | | 174/67 |
| 7,731,045 B2* | 6/2010 | Harpenau | ............ | H02G 3/123 |
| | | | | 220/3.7 |
| 2006/0213132 A1* | 9/2006 | Bonshor | ............... | E04F 17/00 |
| | | | | 52/198 |
| 2006/0260216 A1* | 11/2006 | Bonshor | ............... | E06B 1/62 |
| | | | | 52/97 |
| 2006/0277857 A1* | 12/2006 | Bonshor | ............... | F21V 15/00 |
| | | | | 52/518 |
| 2007/0044401 A1* | 3/2007 | Bonshor | ............... | A47J 17/02 |
| | | | | 52/213 |
| 2007/0175168 A1* | 8/2007 | Bonshor | ............... | F24F 13/082 |
| | | | | 248/307 |
| 2008/0149792 A1* | 6/2008 | Nurenberg | ............ | F21V 21/02 |
| | | | | 248/222.41 |
| 2008/0256880 A1* | 10/2008 | Nurenberg | ............ | H02G 3/088 |
| | | | | 52/198 |
| 2009/0320384 A1* | 12/2009 | Chan | ............... | H02G 3/088 |
| | | | | 52/97 |
| 2011/0240813 A1* | 10/2011 | McMullen | ............ | F21V 21/02 |
| | | | | 248/224.8 |

* cited by examiner

MOUNTING BLOCK FOR VINYL SIDING

CROSS-REFERENCE TO RELATED APPLICATIONS

This application claims the benefit of U.S. Provisional Application No. 63/287,728, filed Dec. 9, 2021, which is hereby incorporated by reference in its entirety.

INTRODUCTION

This disclosure generally relates to blocks for penetrations in buildings that have vinyl siding, or similar, installed thereon.

SUMMARY

An improved mounting block is provided and at least a base plate portion and a face plate portion. The base plate portion has an outer surface extending outward from a mounting surface. The face plate portion is selectively attachable to the base plate portion and has an attachment flange extending toward the base plate portion. One of the face plate portion and the base plate portion has a plurality of snap fit teeth formed thereon, and the other of the face plate portion and the base plate portion has a plurality of snap fit receivers, configured to selectively receive the snap fit teeth.

The face plate portion may further include a plurality of flange flex grooves formed in the attachment flange, allowing walls of the attachment flange to deflect independently from corners, such that the flange flex grooves allow the attachment flange to flex outward from the outer surface of the base plate portion. The base plate portion may further include alignment ribs extending outward from the outer surface, such that the flange flex grooves formed in the attachment flange interface with the alignment ribs formed on the base plate portion.

A two-piece electrical box is also provided and includes an electrical box face and an electrical box back. The two-piece electrical box is selectively attachable to one of a base plate portion or a face plate portion of a mounting block. The two-piece electrical box may have electrical box locators configured to interact with either the base plate portion or the face plate portion of the mounting block.

A utility vent assembly configured to retrofit pre-existing installations I also provided. The utility vent assembly a vent hood extending in the opposite direction from an attachment flange.

DETAILED DESCRIPTION

Figure 1:
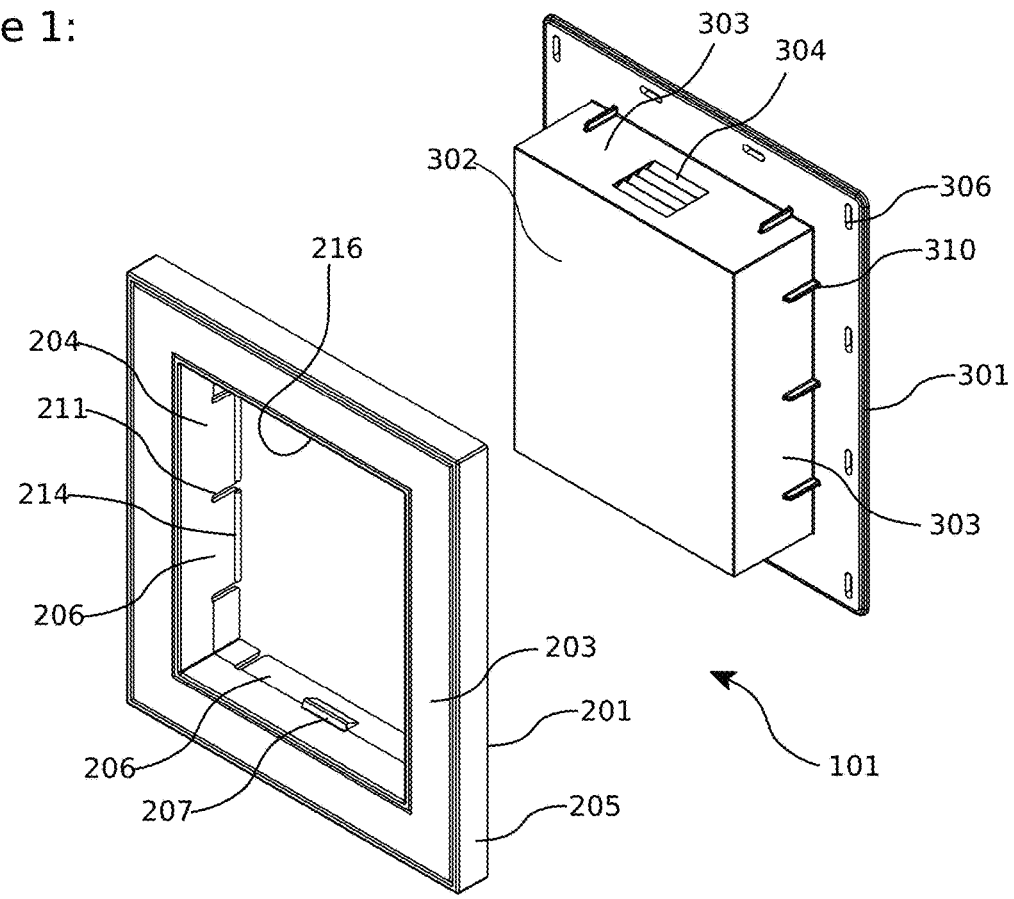
FIG. 1 schematically illustrates a block assembly, shown exploded and unattached, from a front isometric view.
Figure 2:
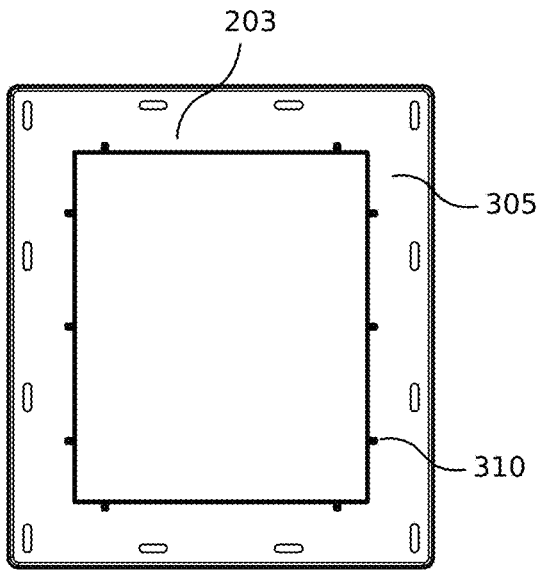
FIG. 2 schematically illustrates a base plate from a front view.
Figure 3:
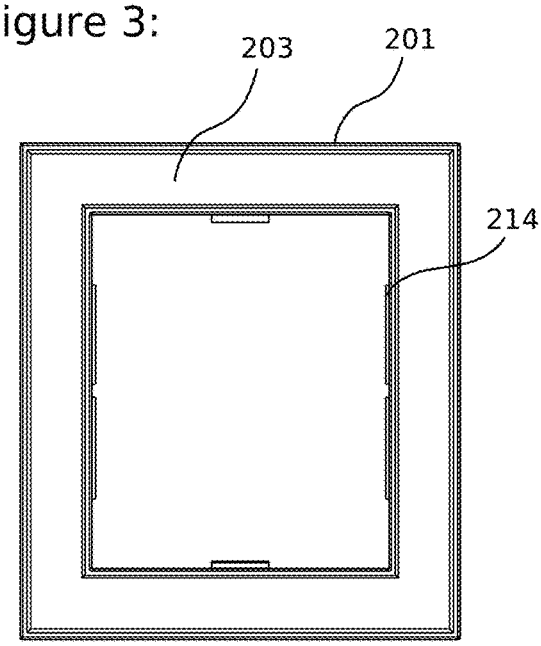
FIG. 3 schematically illustrates a snap ring from a front view.
Figure 4:
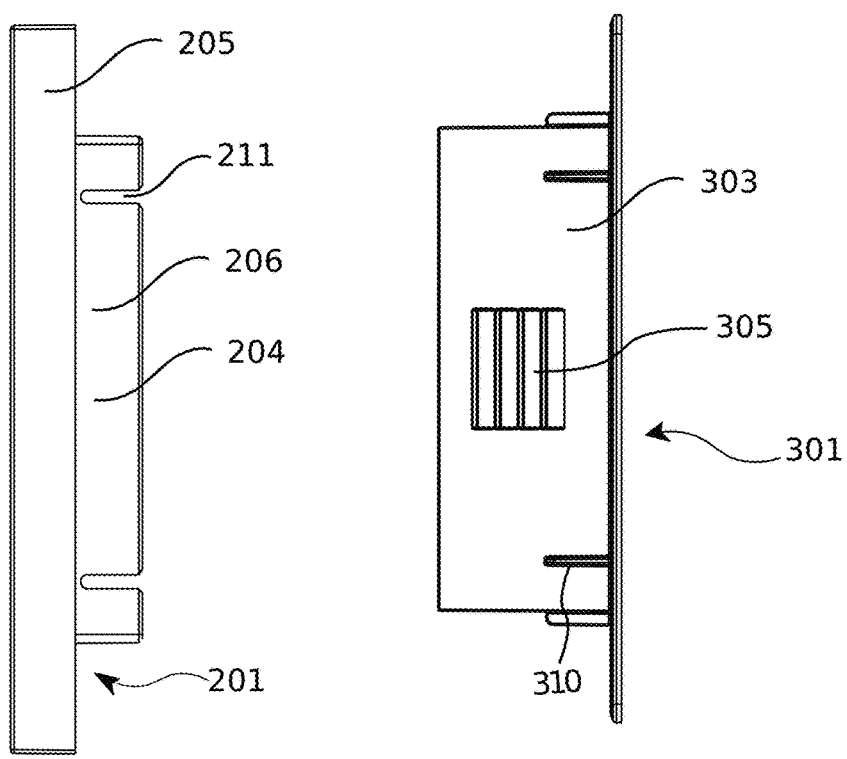
FIG. 4 schematically illustrates a block assembly, shown from an exploded top view.
Figure 5:
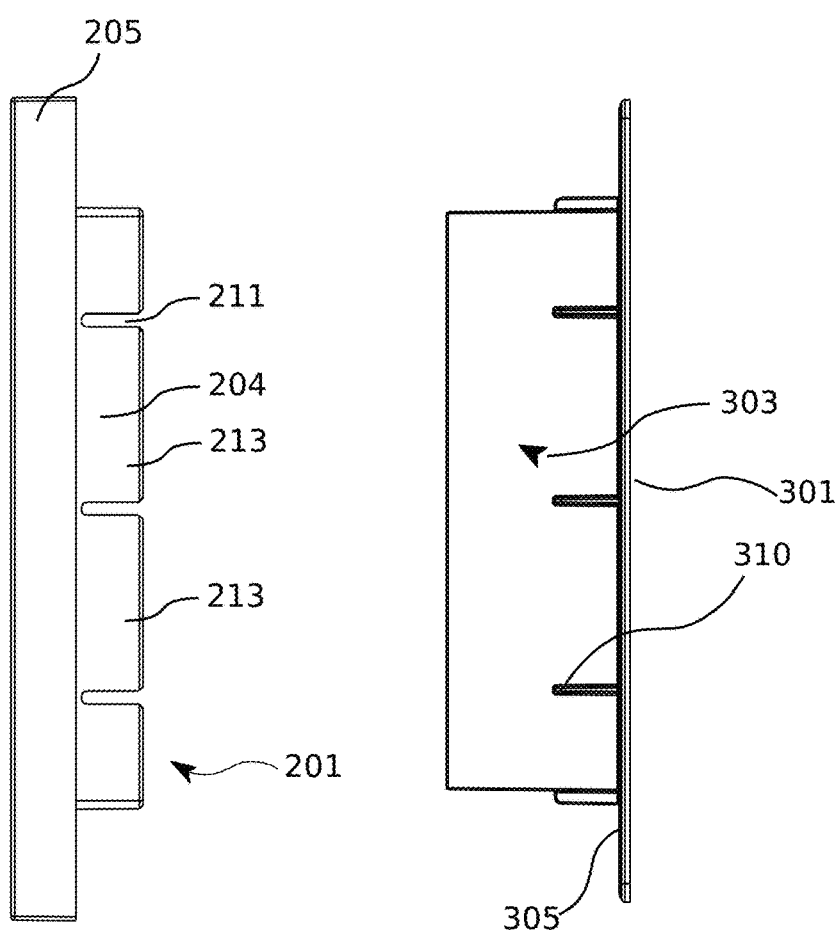
FIG. 5 schematically illustrates a block assembly, shown from an exploded side view.
Figure 6:
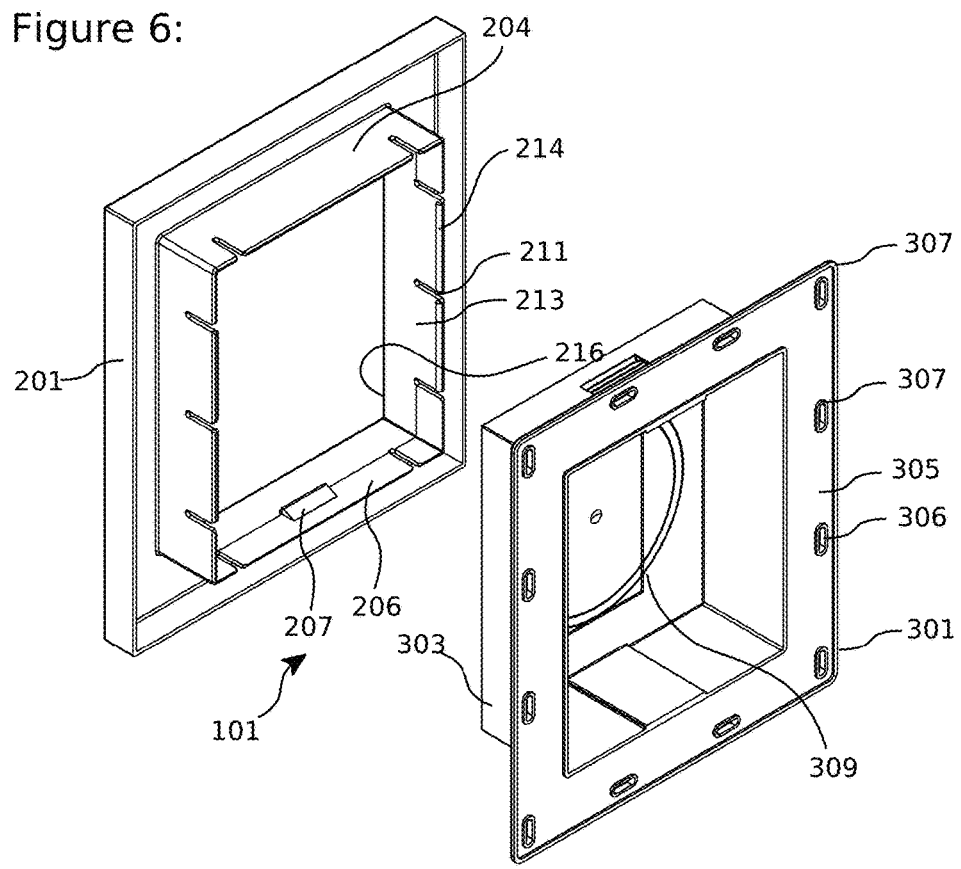
FIG. 6 schematically illustrates a block assembly, shown from an exploded rear isometric view.
Figure 7:
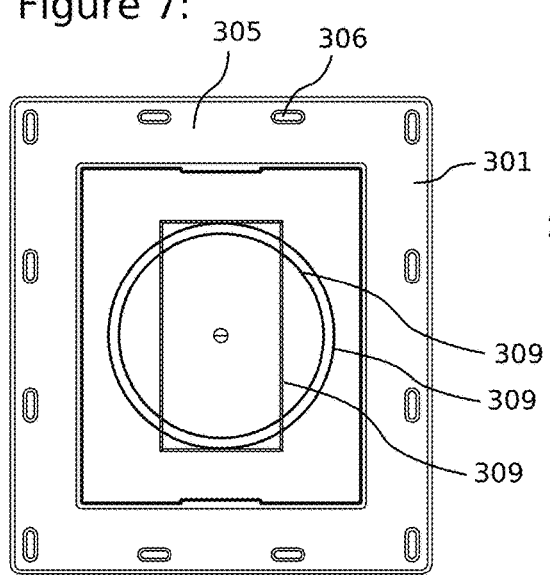
FIG. 7 schematically illustrates a base plate from a rear view.
Figure 8:
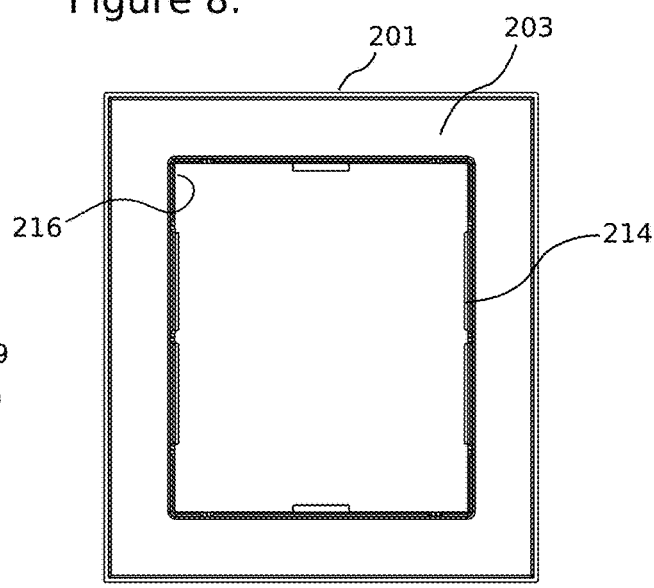
FIG. 8 schematically illustrates a snap ring from a rear view.
Figure 9:
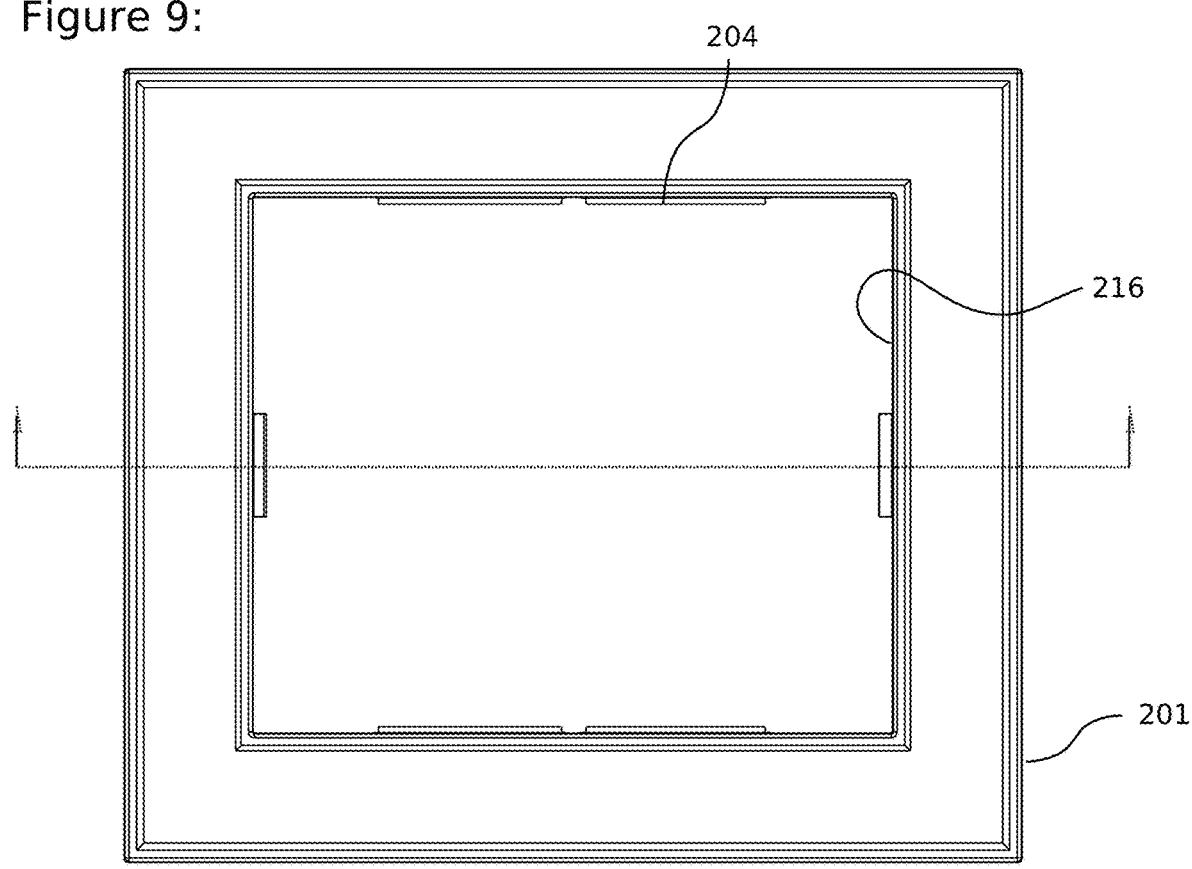
FIG. 9 schematically illustrates a snap ring from a front view, having a section line used in subsequent figures.
Figure 64:
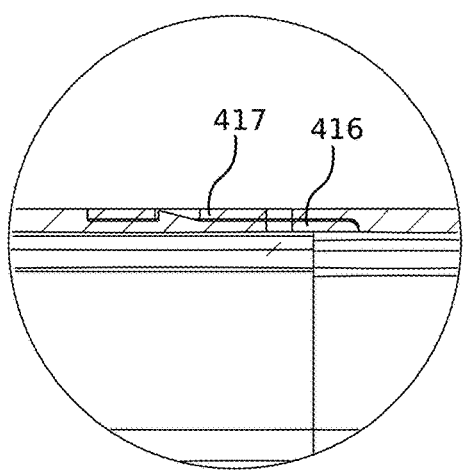
FIG. 64 schematically illustrates a split block assembly with a zoomed view of a locking feature.
Figure 65:
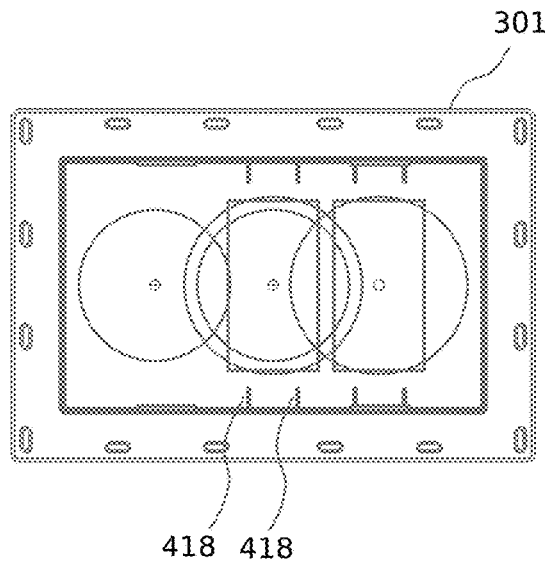
FIG. 65 schematically illustrates a base plate or mounting block having electrical box alignment features, shown from a back view.
Figure 66:
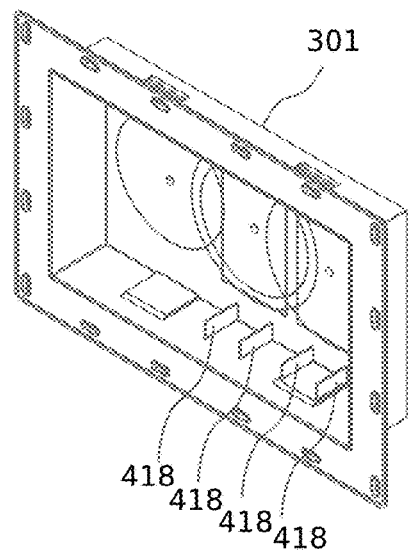
FIG. 66 schematically illustrates a base plate or mounting block having electrical box alignment features, shown from a back isometric view.
Figure 67:
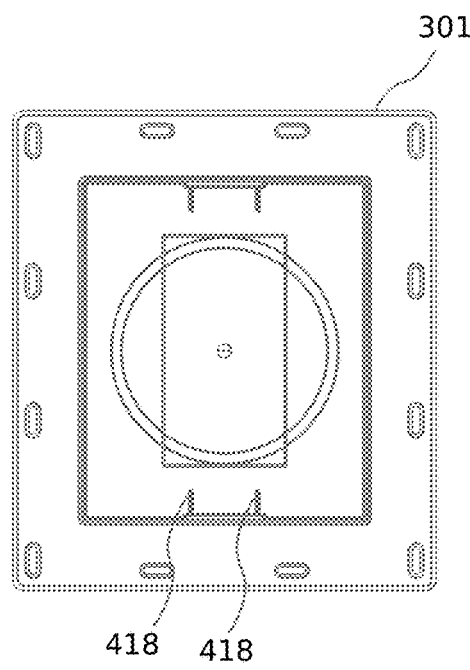
FIG. 67 schematically illustrates a base plate or mounting block having electrical box alignment features, shown from a back view.
Figure 68:
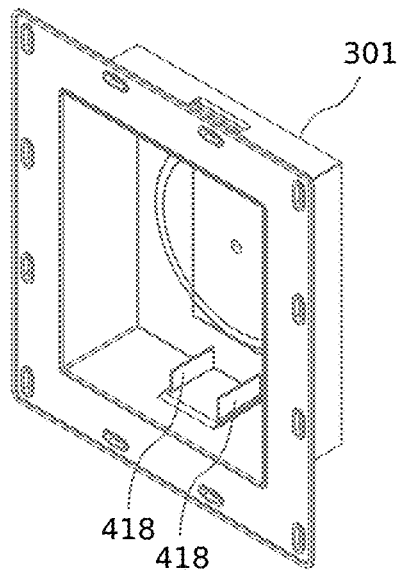
FIG. 68 schematically illustrates a base plate or mounting block having electrical box alignment features, shown from a back isometric view.

Referring to the drawings, like reference numbers correspond to like or similar components wherever possible throughout the several figures. All figures may be referred to in any section of the specification, without regard to numerical order. As shown in FIGS. 1-64 there are various views of different types of blocks usable with vinyl siding or similar products, as will be recognized by those having ordinary skill in the art.

The illustrated vinyl accessory generally consists of a base plate (301) and either a snap ring (201) or face plate (202), which may form, without limitation, a block assembly (101), a split block assembly (102), a vent assembly (103), and/or gable vent. In some instances, the base plate (301) may consist of multiple parts. Note that the structures may be referred to as, without limitation, mounting blocks, utility vents, gable vents, or other terminology recognizable to skilled artisans.

When you attach the snap ring (201) or face plate (202) onto the base plate (301) some designs offer multiple locking locations. The locks are typically created by having a snap fit tooth (207) on an attachment flange (204). A perimeter rib (205) surrounds the face of the face plate (202). The snap fit tooth (207) interacts with a plurality of snap fit receivers (304) on the base plate (301) to provide multiple depths of substantially fixed attachment between the snap ring (201) and the base plate (301). The attachment flange (204) is typically perpendicular to a front surface (203) or the snap ring (201) or face plate (202) application.

The snap ring (201) is used when creating a structural vinyl accessory, such as the block assembly (101). The snap ring (201) has the front surface (203) with a hole in the center, which may be defined as a base plate opening (216). The snap ring (201) attaches around the perimeter of the base plate (301). This may typically, but without limitation, be an application where a coach light or other device is attached to the base plate front surface (302). When attaching such a device to the block assembly (101), it is important to attach directly to the base plate (301) because the base plate (301) is attached directly to a mounting surface or wall (104).

In some instances, such as the vent assembly (103), no devices are attached to the vinyl accessory. The vent assembly (103) has a face plate (202) that variably attaches to the base plate (301) and has a vent (217) or vent hood element feature molded into the face plate front surface (203). This is not structural and is a great application for the face plate front surface (203) design. In the vent assembly (103) the base plate (301) will also have a flapper (403) attached to it. The flapper (403) prevents animals from entering the wall (104) via the vent (217). Note that the vent assembly (103) may also have a plurality of louvers mounted thereto, such as on the vent (217).

The split block assembly (102) typically consists of two base plate portions and a snap ring (201). In this instance the two base plate portions may be referred to as a lower split base (412) and an upper split base (413)—note that these elements may be rotated or flipped in the figures, but the larger portion, the upper split base (413), usually goes on top. This vinyl accessory is used, generally, to go around a penetration in the wall (104) such as a hose, piping going to an air conditioner, etc., that is preinstalled prior to the split block assembly (102).

As shown in FIGS. 47-57, the split block assembly (102) has significant draft, or a draft angle (105), on its interior. The draft angle (105) may be, for example and without limitation, greater than 7 degrees, this may be labeled as draft angle (105). This promotes access for usage along the interior and allow easier painting. Note that other elements of the mounting blocks described herein may also have draft angles (105) formed thereon, for reasons recognizable to those having ordinary skill in the art.

The penetration will not allow for a clean installation of the typical block assembly (101). The split block assembly (102) fixes this problem by having the lower split base (412) and the upper split base (413) attach to each other, with the penetration coming through a hole in an adjoining surface (404) of the two base plate portions. Once in place, the snap ring (201) is installed onto the assembled two base plate portions.

Snap Ring Design

One of the general problems of existing vinyl accessories is the lack of a solid snap fit feel. This is because, on most applications, the alternative attachment flange is a continuous wall. However, the improved design consists of a plurality of flange flex grooves (211) or attachment grooves formed on the attachment flange (204). The flange flex grooves (211) offer several major benefits. It is important to note that the flange flex grooves (211) can exist on the attachment flange (204) walls, corners, or any combination thereof.

The flange flex groove (211) interacts with a snap fit arm (206) which holds a snap fit tooth (207). When the flange flex groove (211) is placed on either side of the snap fit tooth (207), the snap fit arm (206) is formed. Having the snap fit arm (206), versus a continuous wall, allows for more deflection when installing and/or removing the face plate (202) or the snap ring (201) from the base plate (301). The snap fit arm (206) flexes, such that the snap fit teeth (207) also flex, as mated to the snap fit receivers (304). The snap fit receivers (304) may also be referred to as lock receivers.

Note that the flange flex groove (211) and the snap fit teeth (207) may be reversed. In such a configuration, the flange flex grooves (211) are on the snap ring (201) and the snap fit teeth (207) are on the base plate (301). Additionally, there may be mixed placement of the flange flex groove (211) and the snap fit teeth (207) on the on the snap ring (201) and are on the base plate (301), such that one side may have one configuration and the other may have the reverse configuration.

Figure 10:
FIG. 10 schematically illustrates a snap ring having a plane intersection view.
Figure 11:
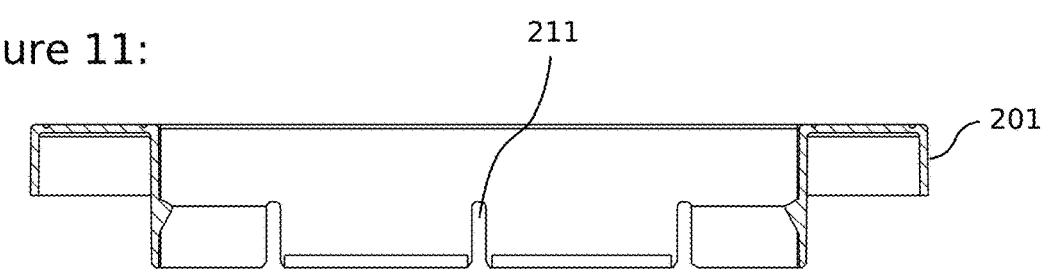
FIG. 11 schematically illustrates a snap ring having a full section view
Figure 12:
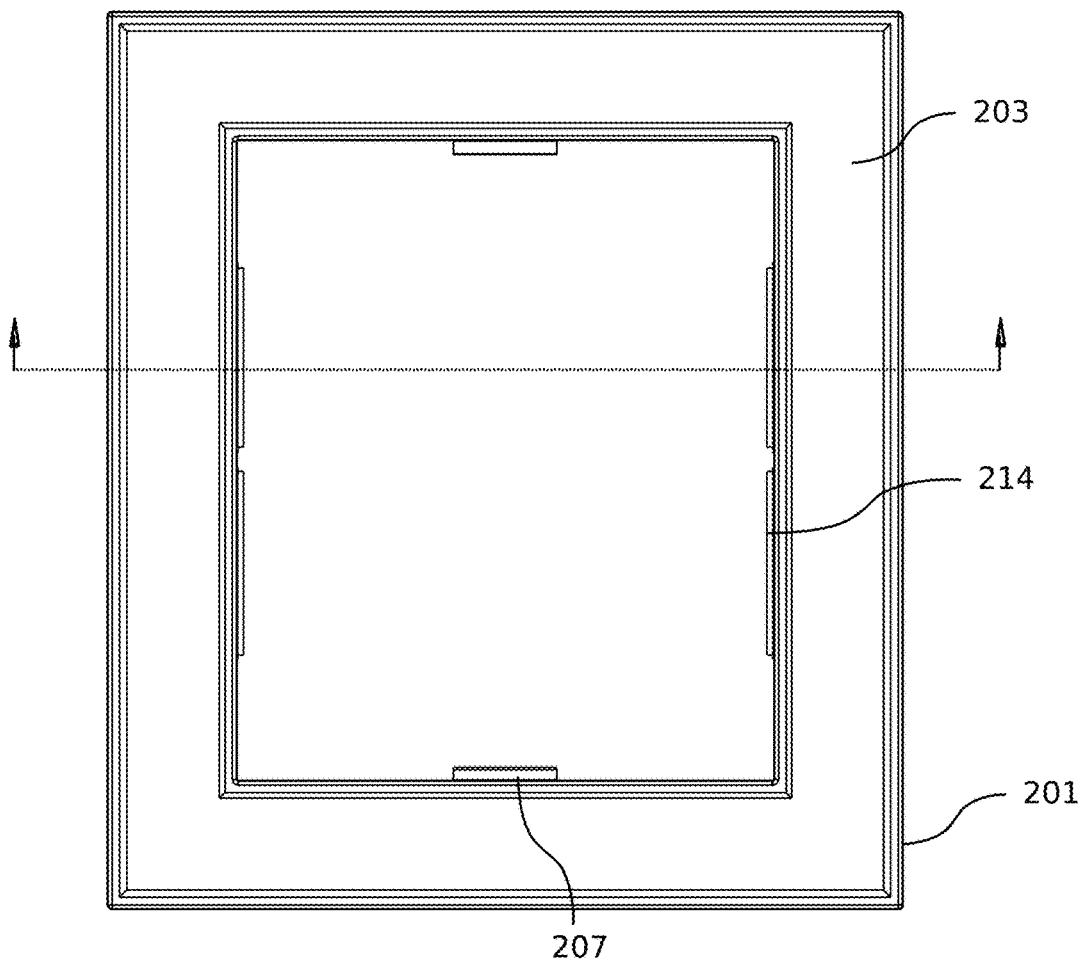
FIG. 12 schematically illustrates a snap ring from a front view, having a section line used in subsequent figures.
Figure 13:
FIG. 13 schematically illustrates a snap ring having a plane intersection view.
Figure 14:
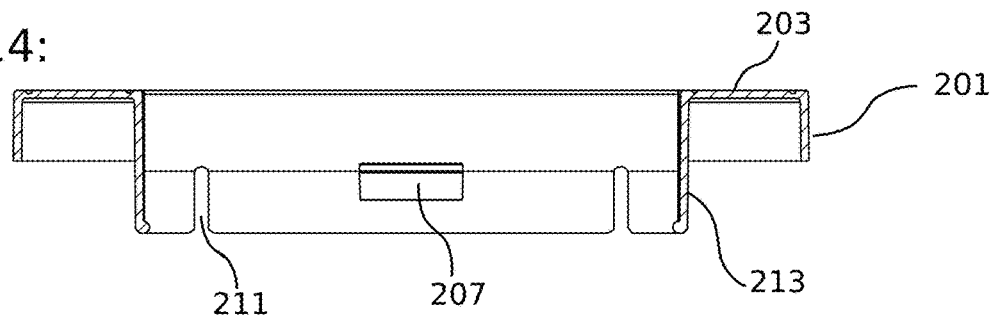
FIG. 14 schematically illustrates a snap ring having a full section view.
Figure 15:
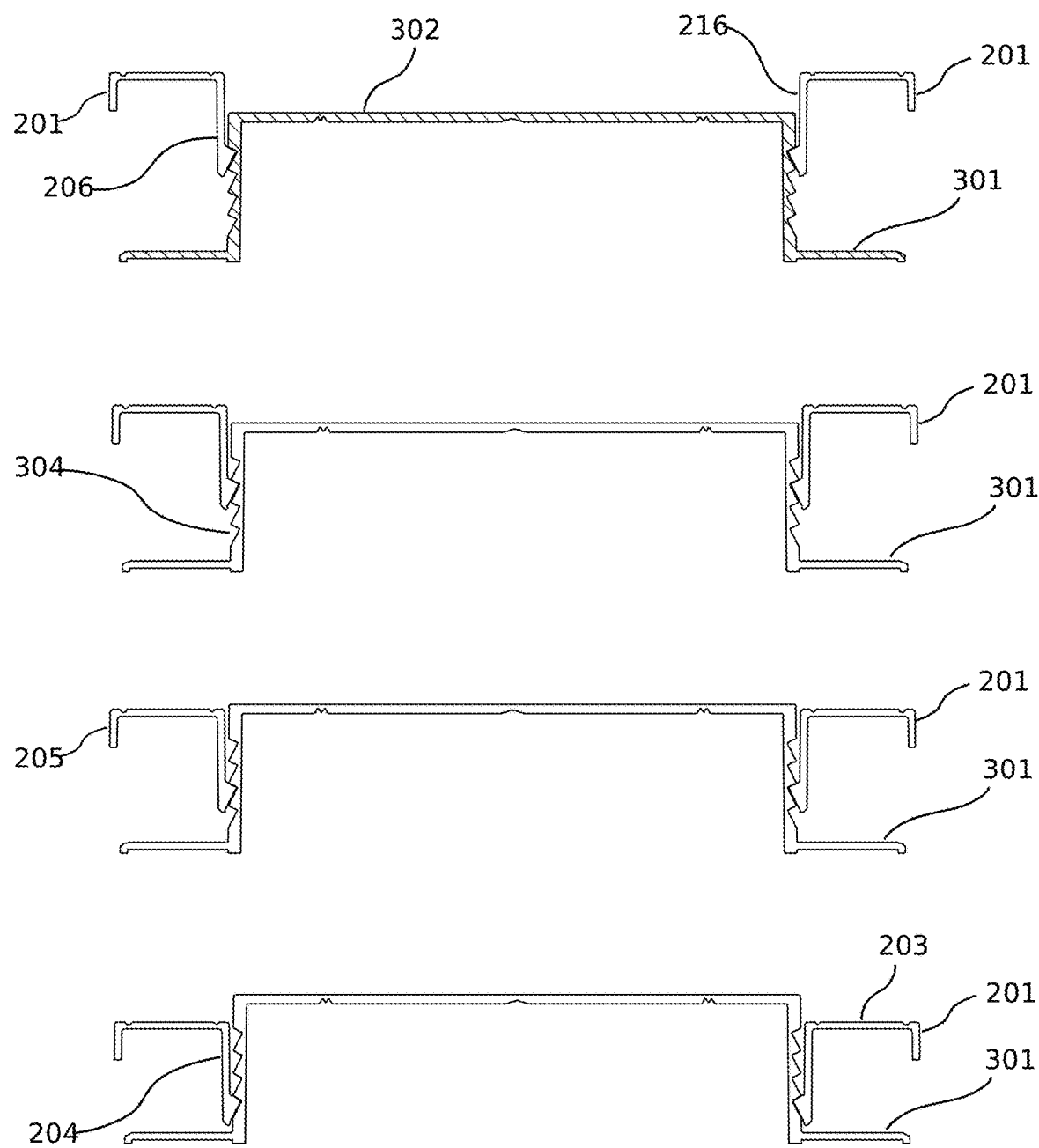
FIG. 15 schematically illustrates a block assembly having four plane intersection views showing different snap fit receiver locking positions.
Figure 16:
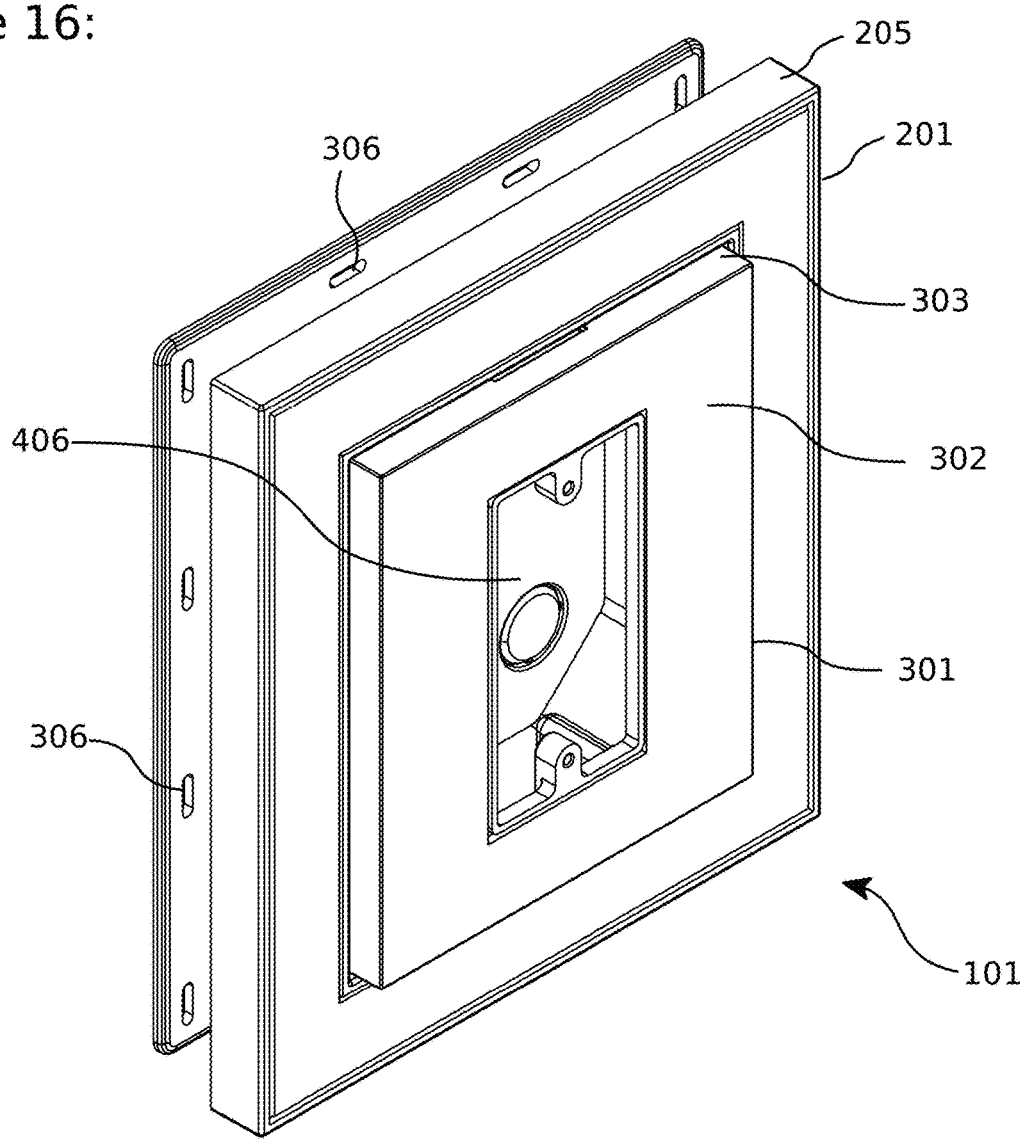
FIG. 16 schematically illustrates a block assembly, having an electrical box, shown as a front isometric view.
Figure 17:
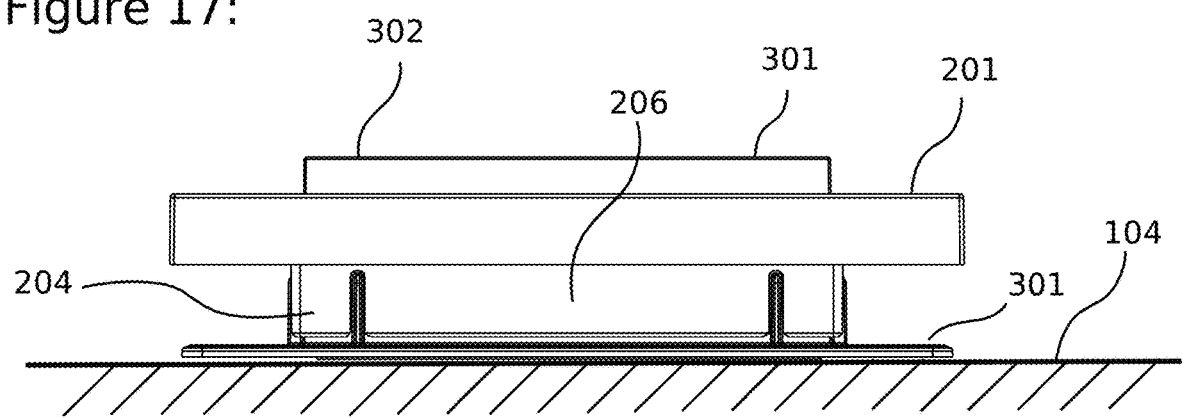
FIG. 17 schematically illustrates a block assembly, having an electrical box, shown as a top view and attached or assembled to a mounting surface or wall.
Figure 18:
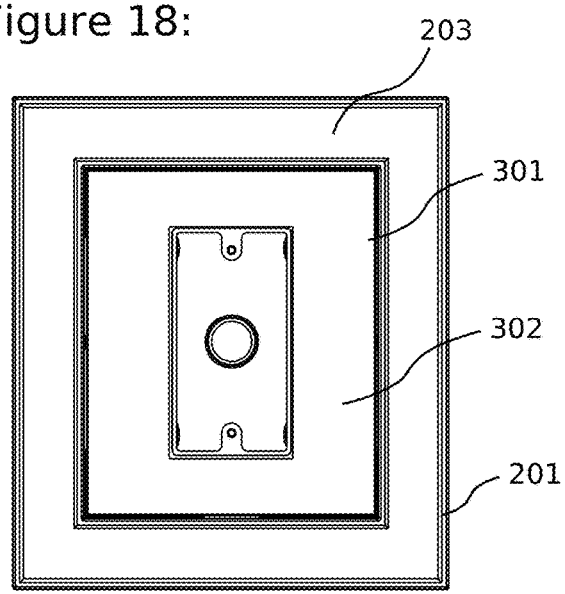
FIG. 18 schematically illustrates a block assembly, having an electrical box, shown as a front view.
Figure 19:
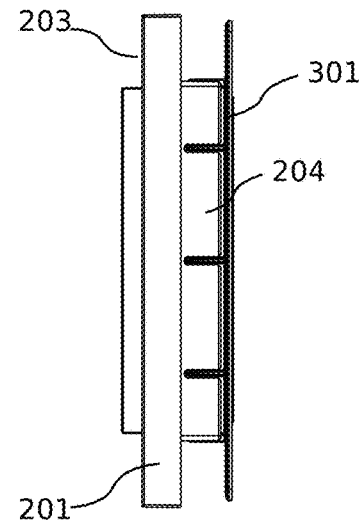
FIG. 19 schematically illustrates a block assembly, having an electrical box, shown as a side view.
Figure 20:
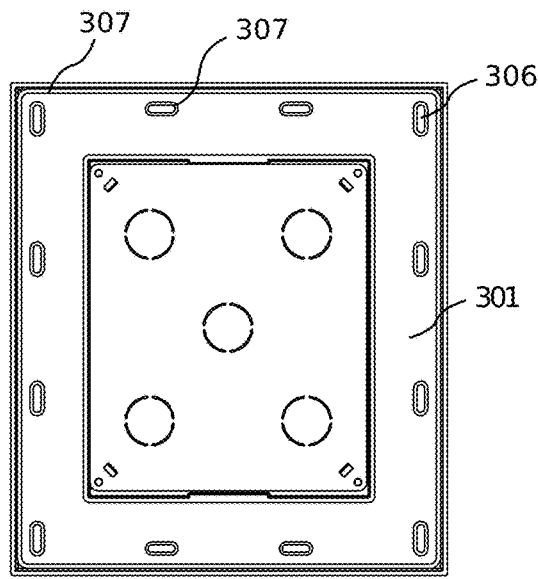
FIG. 20 schematically illustrates a block assembly, having an electrical box, shown as a back view.
Figure 21:
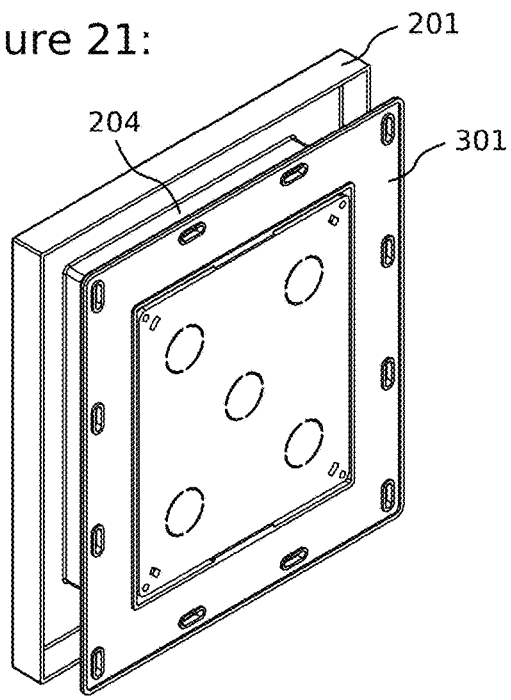
FIG. 21 schematically illustrates a block assembly, having an electrical box, shown as a rear isometric view.
Figure 22:
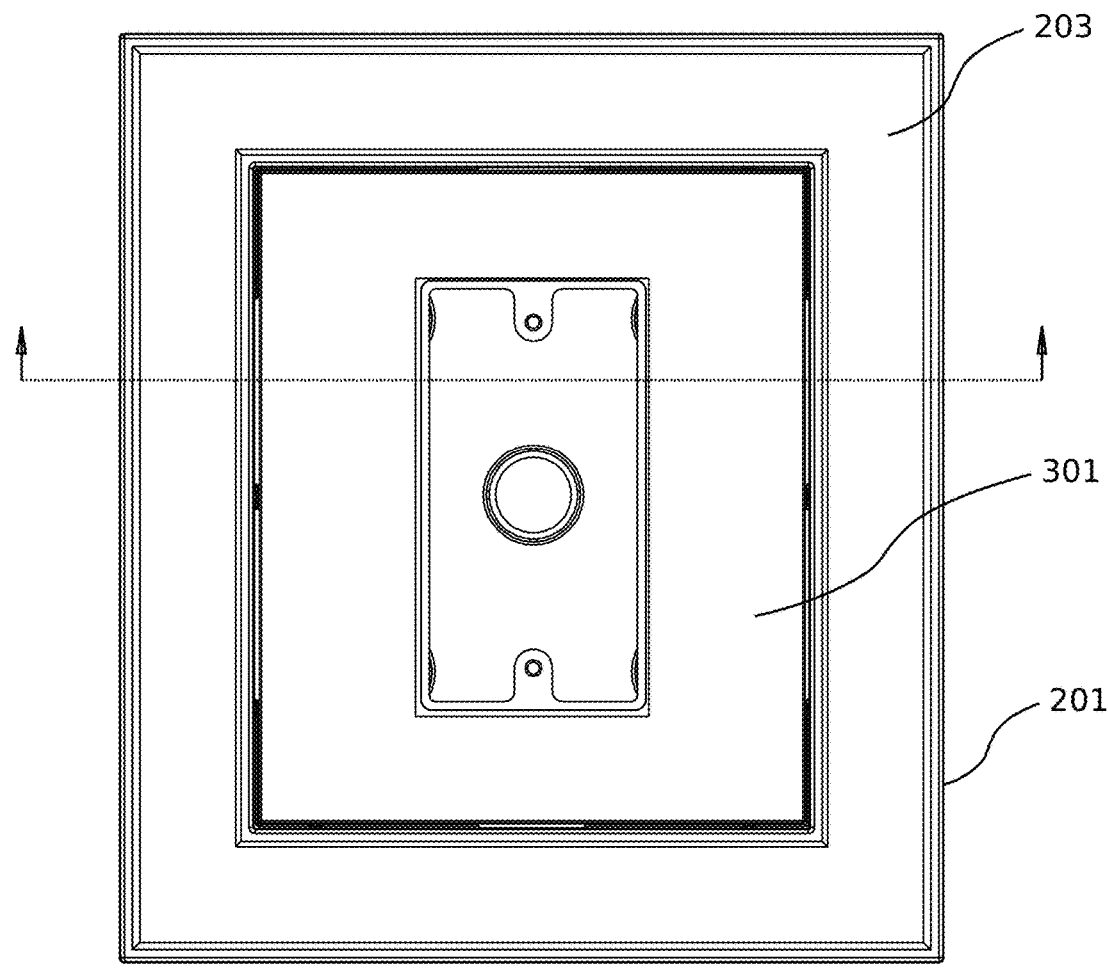
FIG. 22 schematically illustrates a block assembly, having an electrical box, shown as a front view, having a section line used in subsequent figures.
Figure 23:
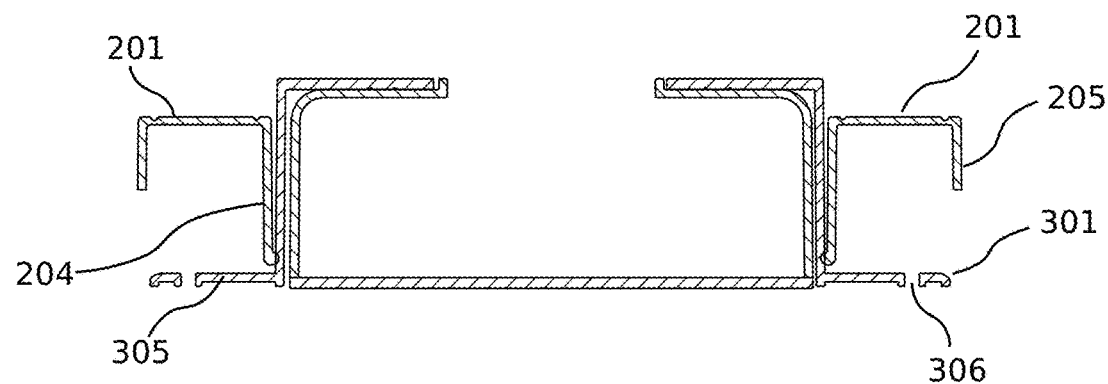
FIG. 23 schematically illustrates a block assembly, having an electrical box, shown as a plane intersection view.
Figure 24:
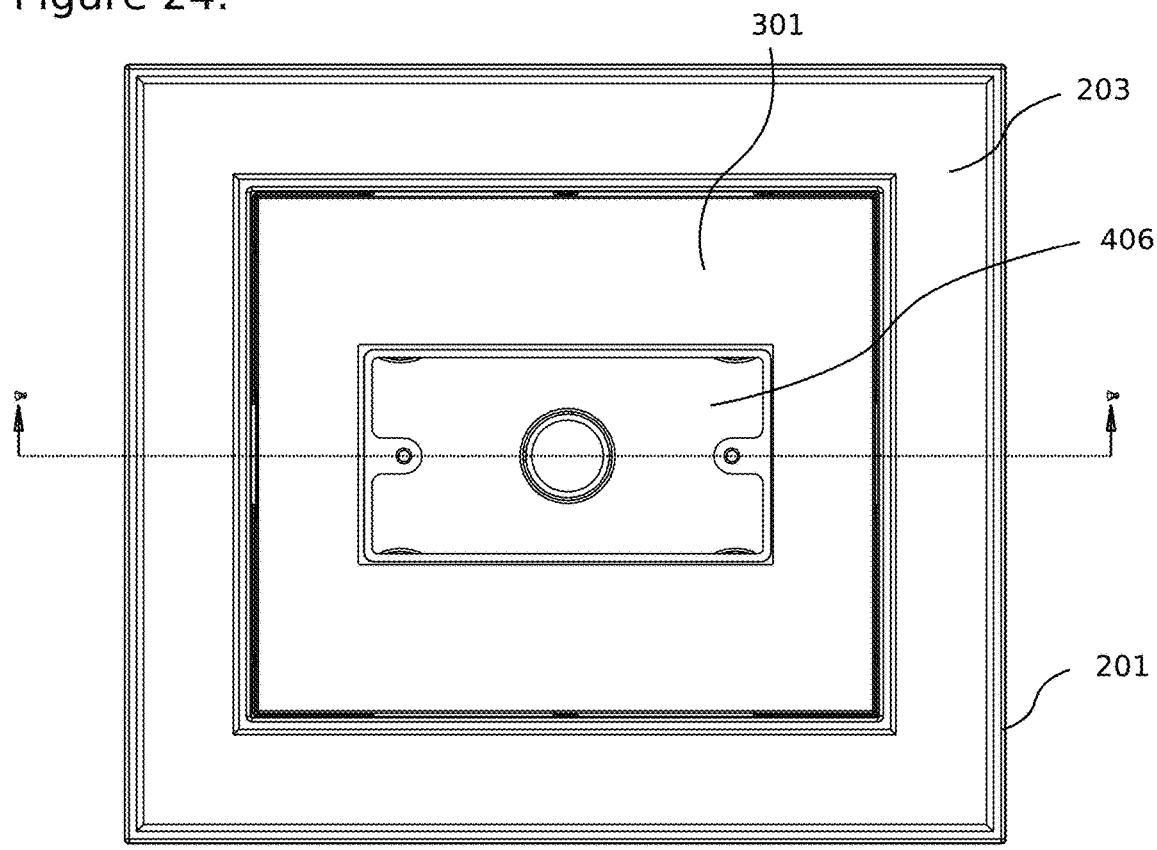
FIG. 24 schematically illustrates a block assembly, having an electrical box, shown as a front view, having a section line used in subsequent figures.
Figure 25:
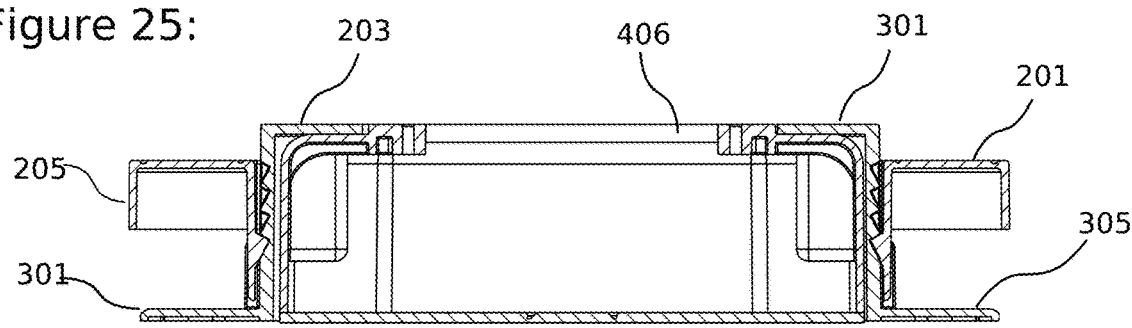
FIG. 25 schematically illustrates a block assembly, having an electrical box, shown as full section view.
Figure 26:
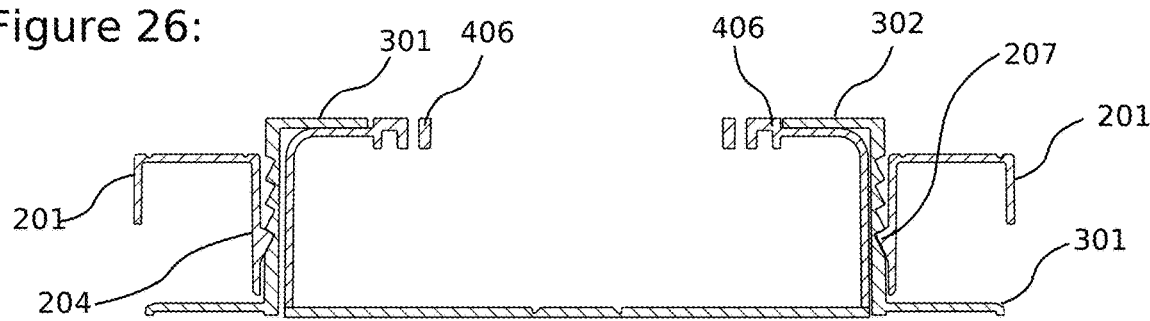
FIG. 26 schematically illustrates a block assembly, having an electrical box, shown as a plane intersection view.
Figure 27:
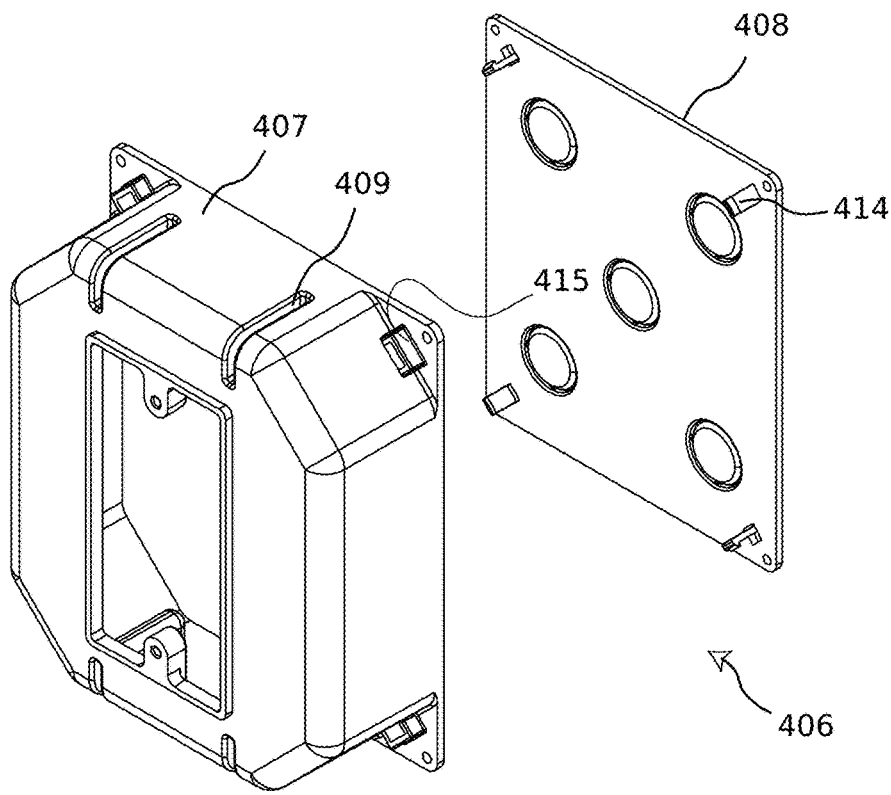
FIG. 27 schematically illustrates an electrical box, shown exploded from a front isometric view.
Figure 28:
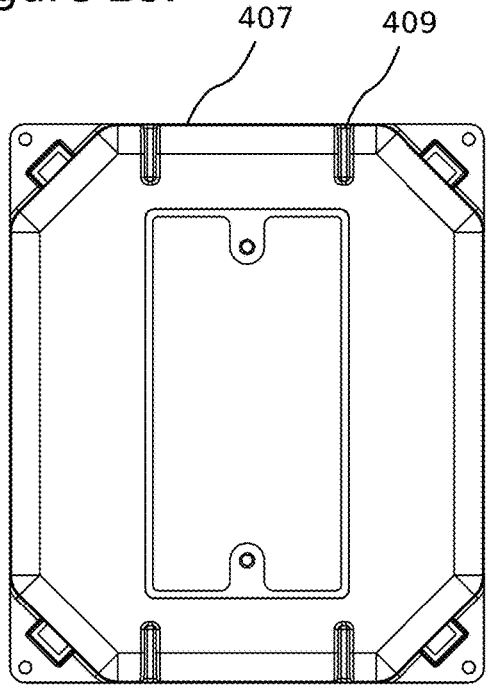
FIG. 28 schematically illustrates an electrical box, shown from a front view.
Figure 29:
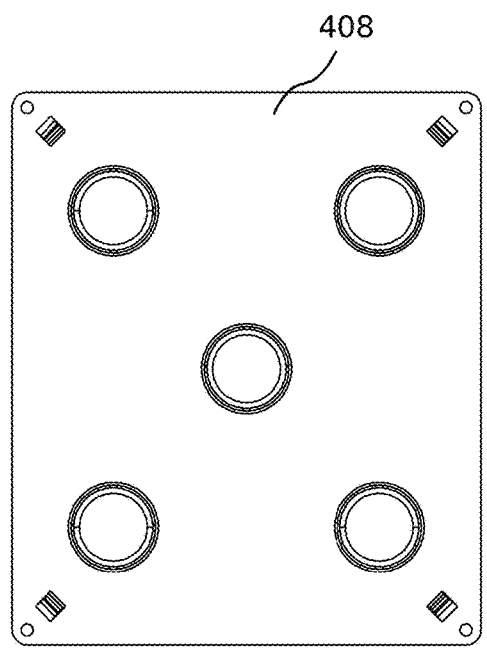
FIG. 29 schematically illustrates an electrical box, shown from a rear view.

More deflection allows for the snap fit tooth (207) to have a larger tooth overhang depth (210), which is illustrated in, at least, FIG. 10. The illustrated tooth overhang depth (210) is about 25% longer than alternative products, which creates a better feeling snap for the installer/assembler. The increased tooth overhang depth (210) also allows the shown device to have more angle on the snap fit tooth (207) for a tooth entrance side (208) and a tooth retraction side (209). An increased angle helps with snap fit feeling, and the increased tooth overhang depth (210) further allows for adequate holding power. Note that there are multiple click, or holding, positions between the snap fit teeth (207) and the base plate (301).

Another benefit of the flange flex groove (211) is that mating alignment ribs (310) may be formed on the base plate (301) to interface directly with one or more of the flange flex grooves (211). If siding is installed too tightly around the base plate (301) there may not be sufficient room to install the snap ring (201) or face plate (202). The alignment ribs (310) are designed to provide tolerance and prevent abutting siding from encroaching too tightly on an outer surface (303) of the base plate (301) to allow the snap ring (201) or attachment flange (204) of the face plate (202) to be attached with adequate spacing. This greatly simplifies the installation process of cutting and installing the siding/vinyl accessory. The alignment ribs (310) also provide alignment for the snap ring (201) mating to the base plate (301).

Note that the flange flex grooves (211) are also present on the attachment flanges (204) in areas without the snap fit tooth (207). The attachment flanges (204) in these areas can include an anti-rotation features such as horizontal tension ribs (214). In this instance, the term horizontal refers to structures that are generally parallel to the mounting surface or wall (104).

The horizontal tension rib (214) will be placed between two flange flex grooves (211) in an area that may be referred to as a tension rib arm (213). The horizontal tension rib (214) is designed to interact with the outer surface (303) of the base plate (301). The horizontal tension rib (214) is designed to have slight interference with, or apply gentle pressure to, the base plate (301) and the outer surface (303). When installed, the tension rib arm (213) slightly deflects such that the horizontal tension rib (214) applies slight pressure to the base plate (301). This pressure allows the snap ring (201) or face plate (202) to have a more solid feel relative to alternative designs, particularly when the snap fit tooth (207) is in the outermost groove of the snap fit receiver (304).

To reduce the costs of manufacturing, in some instances, an alternate design anti-rotation feature can be used. Instead of having the horizontal tension rib (214) on the attachment flange (204), a vertical tension rib (405) may be added to the outer surface (303) of the base plate (301). The vertical tension rib (405) is designed to contact the tension rib arm (213) on the attachment flange (204). The vertical tension rib (405) extends from the outer surface (303), generally, less than the alignment ribs (310), such that the alignment ribs (310) still interface with the flange flex grooves (211). In some cases, this design prevents overly complicated tool actions.

Utility Vent Improvements

In some instances, there is a need to retrofit install of the vent assembly (103). This means that the siding is already on the building or the wall (104) of the building. The contractor will want to install a vent assembly (103) without removing the siding. The illustrated vent assembly (103) incorporates some features to make this situation easier and better for the installer.

The vent assembly (103) has two features that benefit retrofit applications. One is a vent nail flange score line (401). The contractor may remove the nailing flange (305) by cutting along the vent nail flange score line (401). With the nail flange (305) removed, or partially removed, the vent can easily be installed in the retrofit application. Another is a plurality of vent attachment features (402). The base plate (301) can be attached to the wall (104) via the vent attachment features (402). The vent attachment features (402) exist within the outer surface (303). If the installer does not cut along the vent nail flange score line (401), nail slots (306) may be used to attach the vent assembly (103) to the mounting surface or wall (104).

Vinyl siding accessories are typically made with an injection molding process. When the parts cool, flat sections often warp. The illustrated vent assembly (103) incorporates a curved vent lip (411) along the opening of the vent (217), which may reduce the amount of bowing in the front of the vent after cooling. The vent assembly (103), or other structures, may include several additional features, including, without limitation: one or more score lines (309) or a nailing flange chamfer (308).

Split Block Design

With the improved design to the snap ring (201) of the split block assembly (102), the design improves over other, previous products. In some instances, the snap ring (201) needs to be cut to be placed around an existing protrusion from the wall (104), in which case the snap ring (201) is cut through the snap fit tooth (207). The split block assembly (102), however, includes the lower split base (412) and the upper split base (413). Additionally, if the snap ring (201) is cut through the snap fit tooth (207), the tooth overhang depth (210) of the snap fit tooth (207) may allow the snap ring (201) to better hold to the base plate (301).

Other designs have the snap ring attach on the inside of the outer surface. This would force the alternative base plate to hold the alternative snap ring in place. However, because of the improved tension, the snap ring (201) can be installed around the outer surface (303) of the split block assembly (102), just like the block assembly (101). This is easier to use, has a better aesthetic appearance, is better for the installer, and is better for painting.

The split block assembly (102) includes a split block arm (416), having a tab, on the lower split base (412). Additionally, the split block assembly (102) includes a split block receiver (417), having a receiving slot for the tab of the split block arm (416), on the upper split base (413). Note that the split block arm (416) and the split block receiver (417) may be switched between the lower split base (412) and the upper split base (413), and one side may be formed the opposite of the other, such that each base portion has one of each feature.

The split block assembly (102) lacks lifters or lock marks on its visible surface. Lifters are a part of an injection molding tool to provide undercuts in a part. They are moving parts in the tool that allow the part to be removed once molded. On alternative block assemblies, there are tool lifter witness marks—which include, without limitation, lifters, lock marks, dimples, burrs, raised ridges or other surface texture imperfections—visible on the exterior, which is not ideal and reduces aesthetics.

Universal Electrical Box

Figure 30:
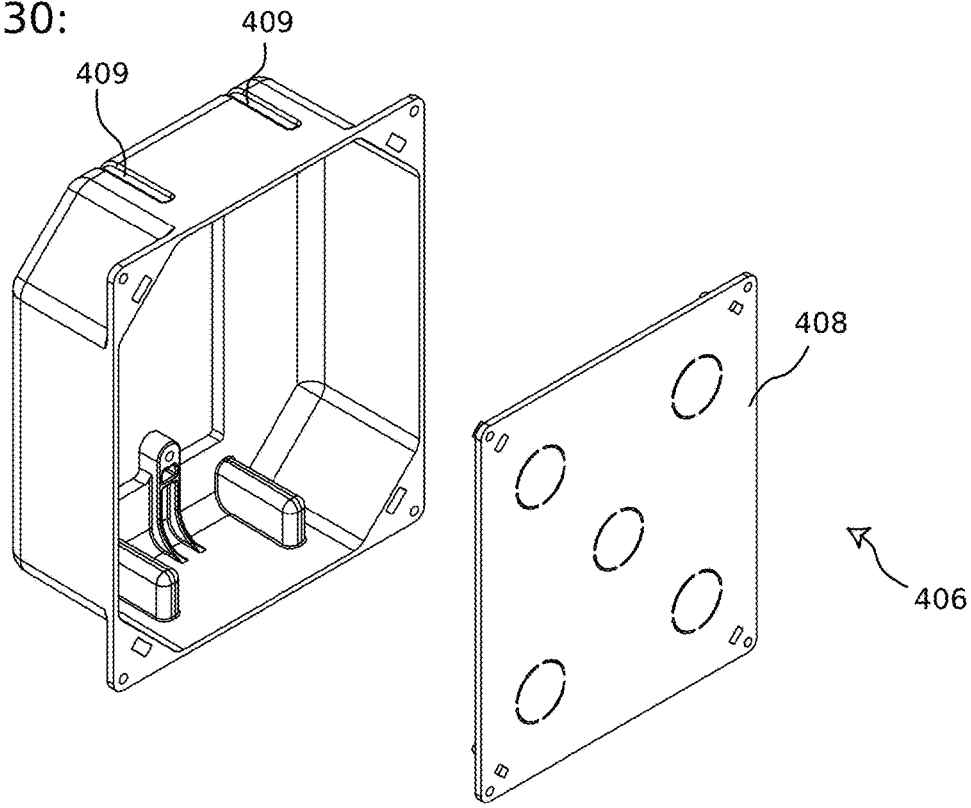
FIG. 30 schematically illustrates an electrical box, shown exploded from a rear isometric view.
Figure 31:
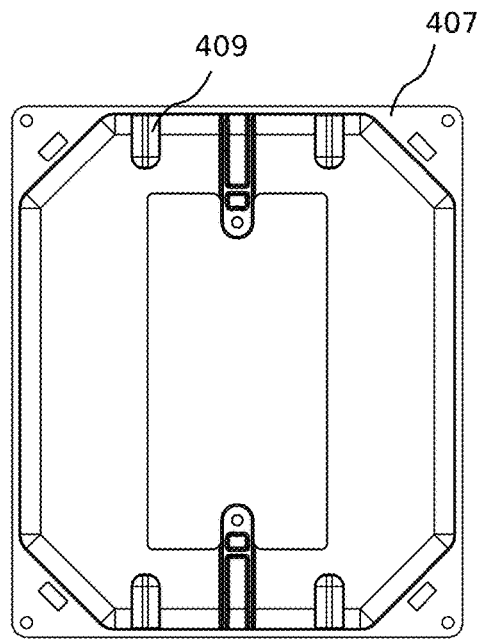
FIG. 31 schematically illustrates an electrical box face, shown from a rear view.
Figure 32:
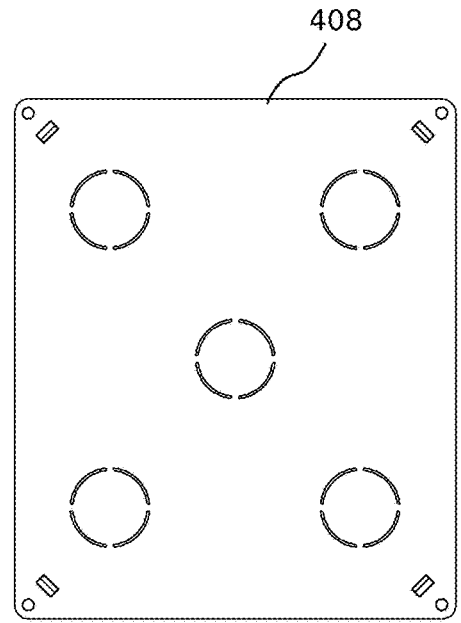
FIG. 32 schematically illustrates an electrical box back, shown from a rear view.
Figure 33:
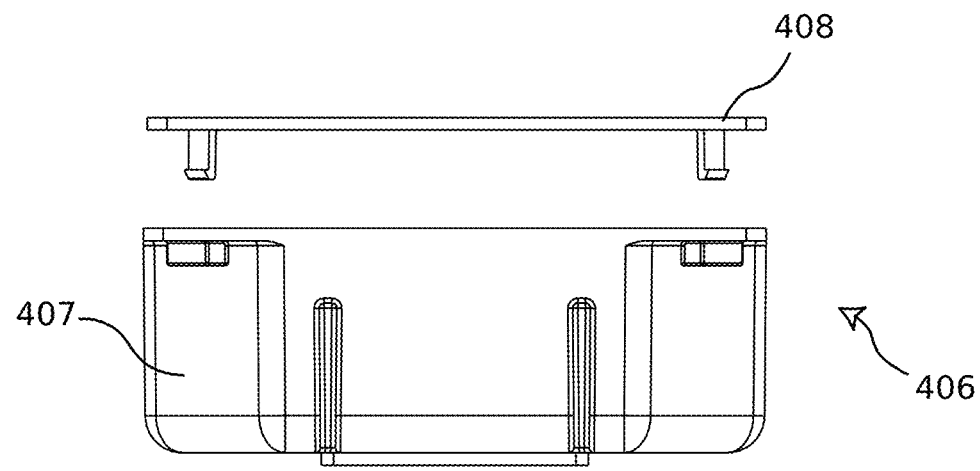
FIG. 33 schematically illustrates an electrical box, shown exploded from a top view.
Figure 34:
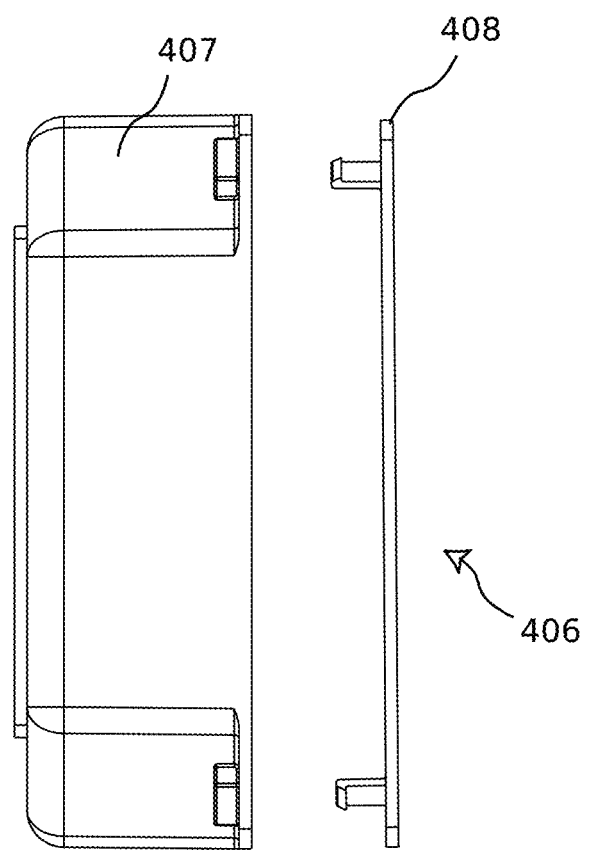
FIG. 34 schematically illustrates an electrical box, shown exploded from a side view.
Figure 35:
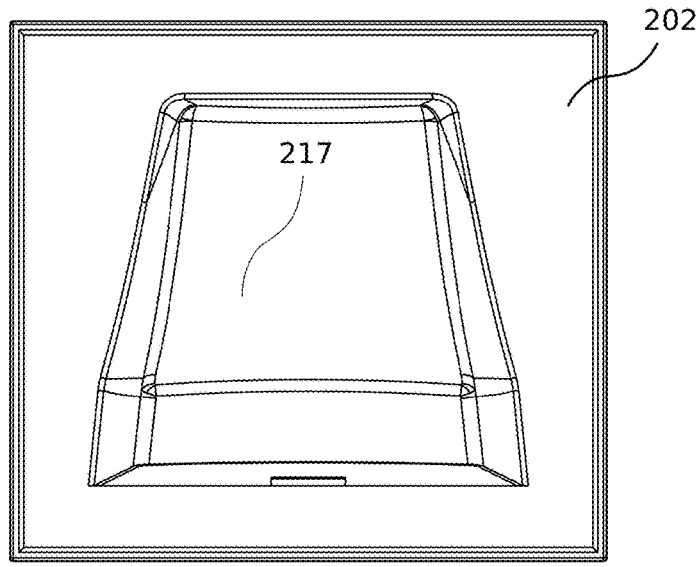
FIG. 35 schematically illustrates a vent face plate, shown from a front view.
Figure 36:
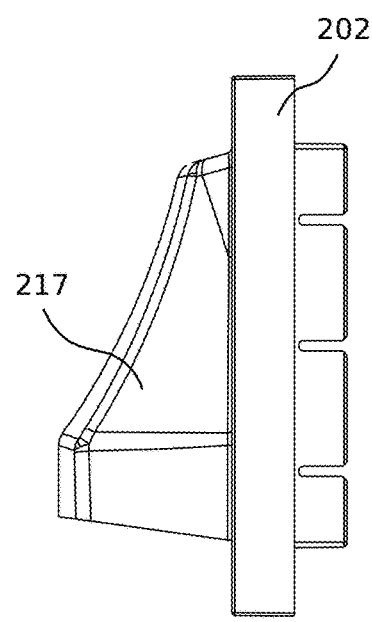
FIG. 36 schematically illustrates a vent face plate, shown from a side view.
Figure 37:
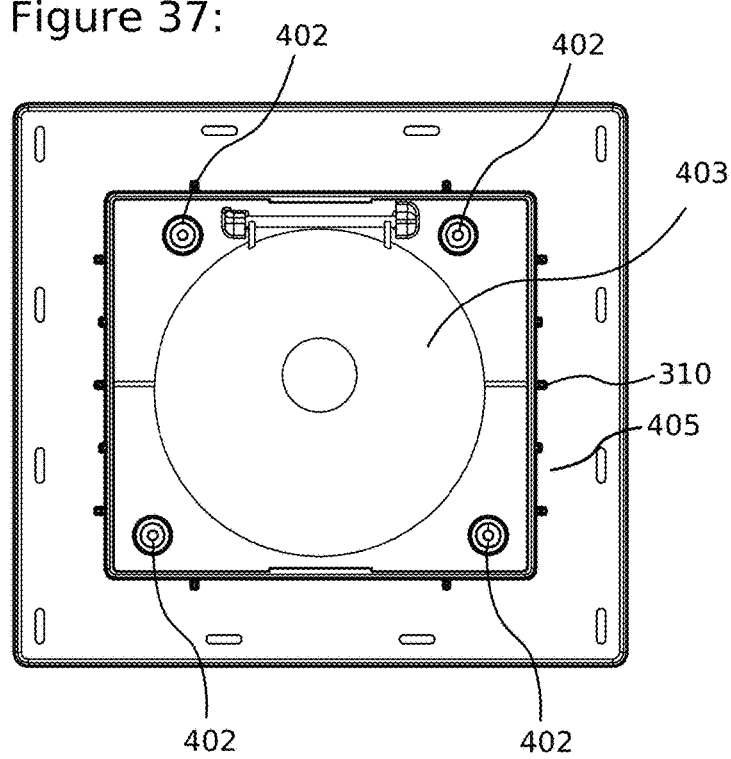
FIG. 37 schematically illustrates a vent backplate, shown from a front view.
Figure 38:
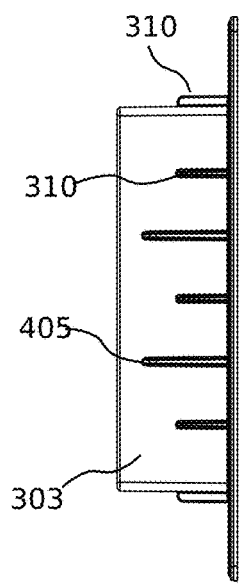
FIG. 38 schematically illustrates a vent backplate, shown from a side view.
Figure 39:
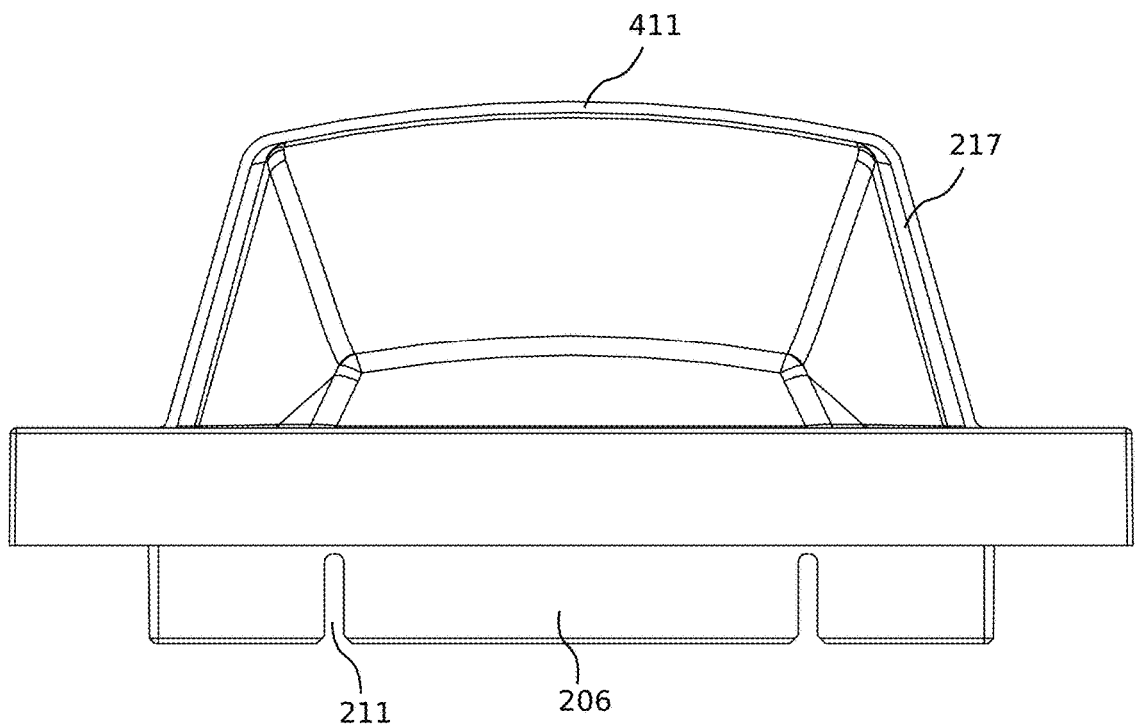
FIG. 39 schematically illustrates a vent face plate, shown from a bottom view.
Figure 40:
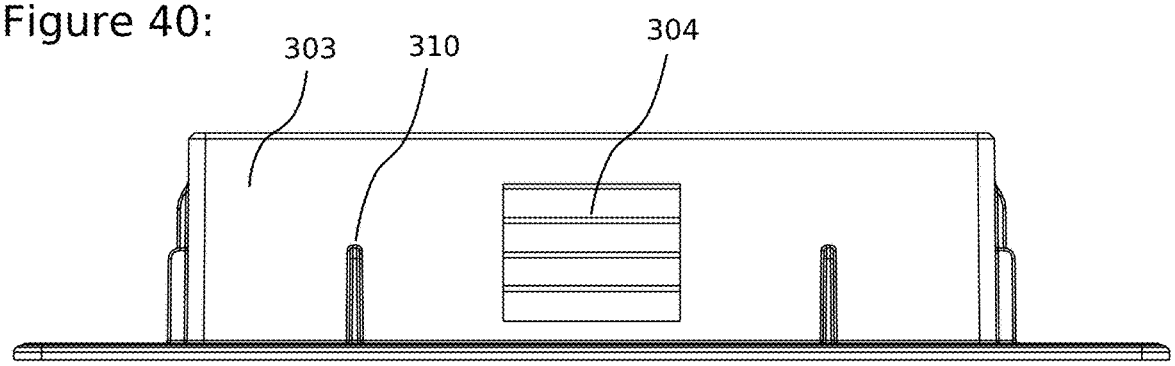
FIG. 40 schematically illustrates a vent backplate, shown from a bottom view.
Figure 41:
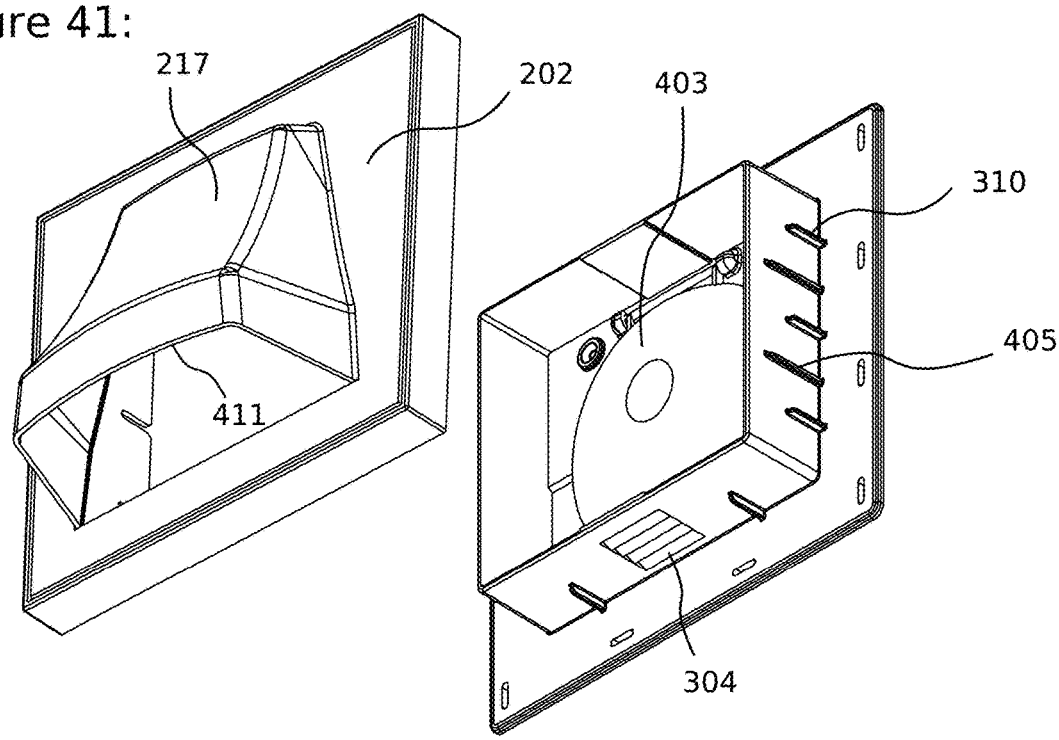
FIG. 41 schematically illustrates a vent assembly, shown exploded from a front-bottom isometric view.
Figure 42:
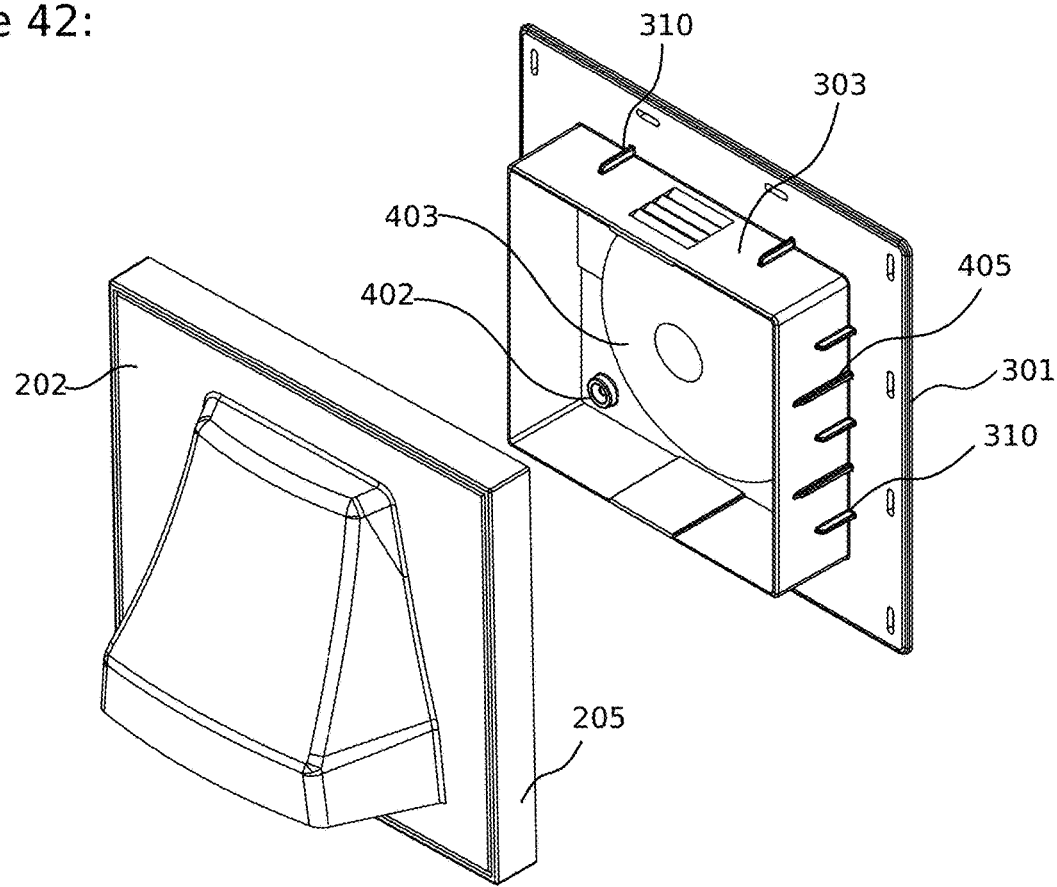
FIG. 42 schematically illustrates a vent assembly, shown exploded from a front-top isometric view.
Figure 43:
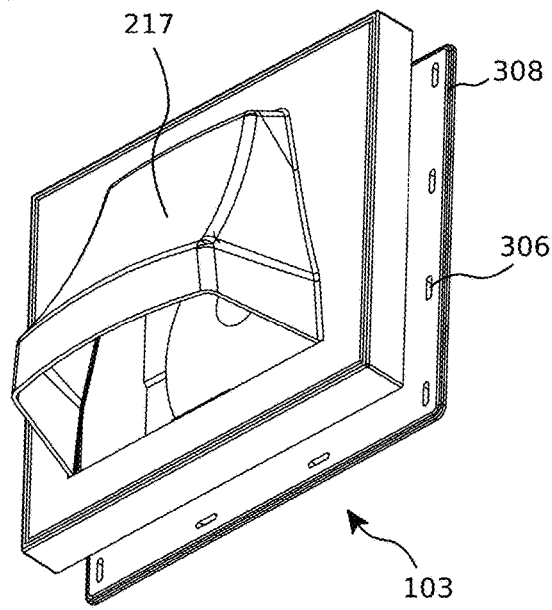
FIG. 43 schematically illustrates a vent assembly, shown from a front-bottom isometric view.
Figure 44:
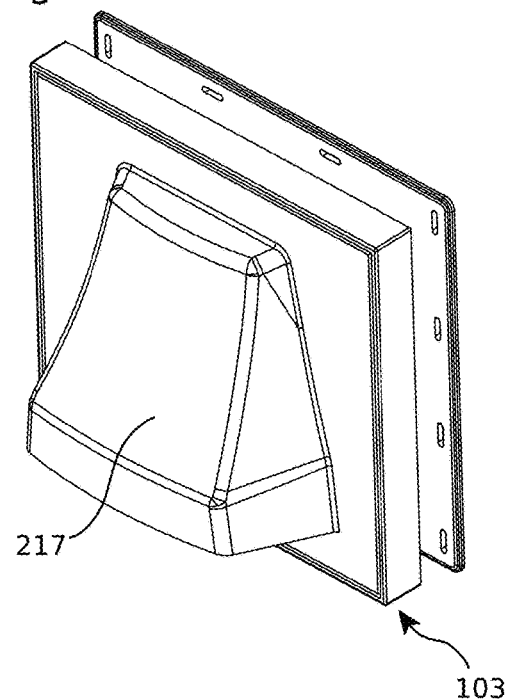
FIG. 44 schematically illustrates a vent assembly, shown from a front-top isometric view.
Figure 45:
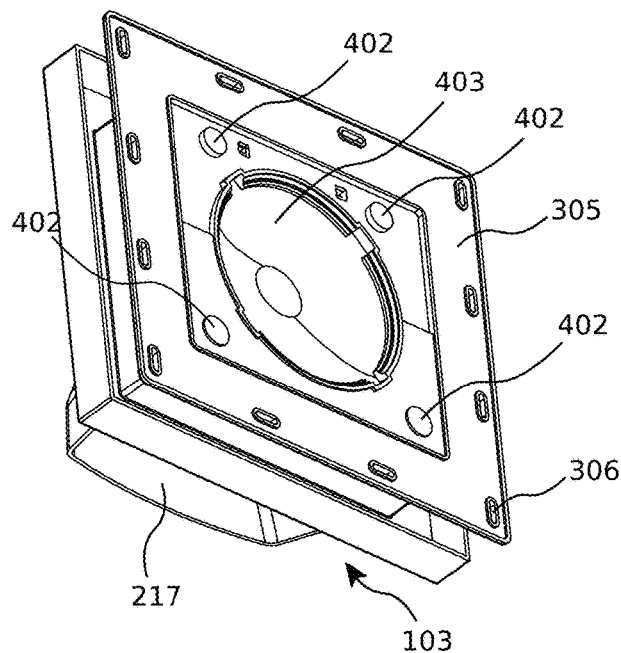
FIG. 45 schematically illustrates a vent assembly, shown from a rear-bottom isometric view.
Figure 46:
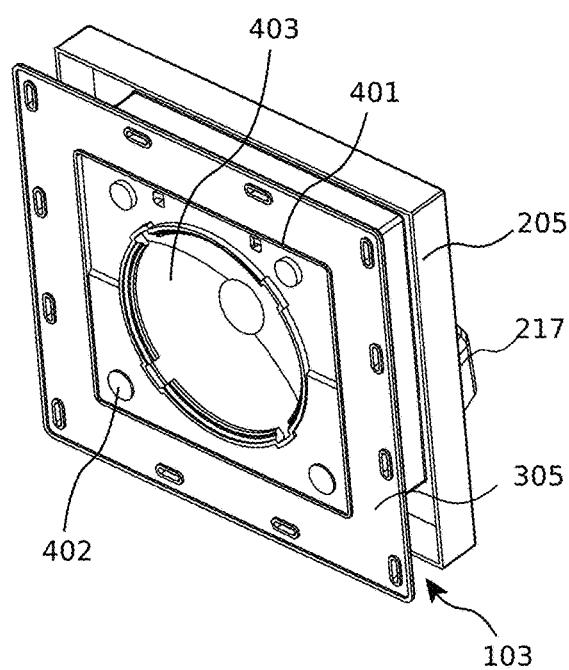
FIG. 46 schematically illustrates a vent assembly, shown from a rear-top isometric view.
Figure 47:
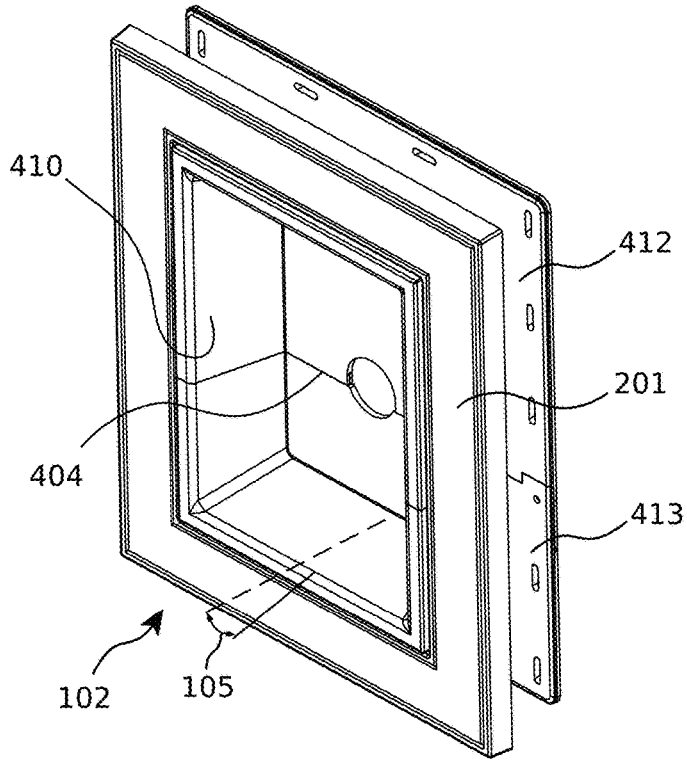
FIG. 47 schematically illustrates a split block assembly, shown from a front isometric view.
Figure 48:
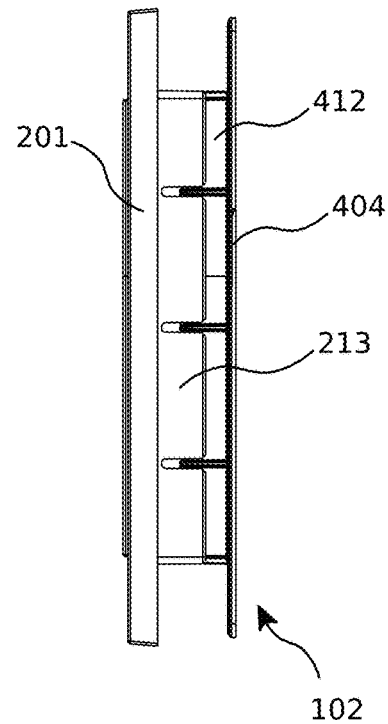
FIG. 48 schematically illustrates a split block assembly, shown from a side view.
Figure 49:
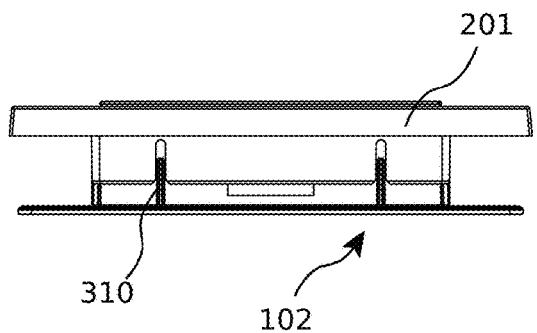
FIG. 49 schematically illustrates a split block assembly, shown from a top view.
Figure 50:
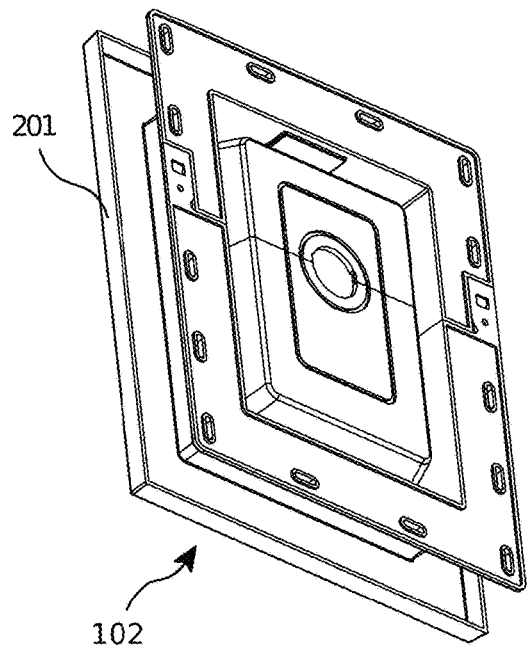
FIG. 50 schematically illustrates a split block assembly, shown from a rear isometric view.
Figure 51:
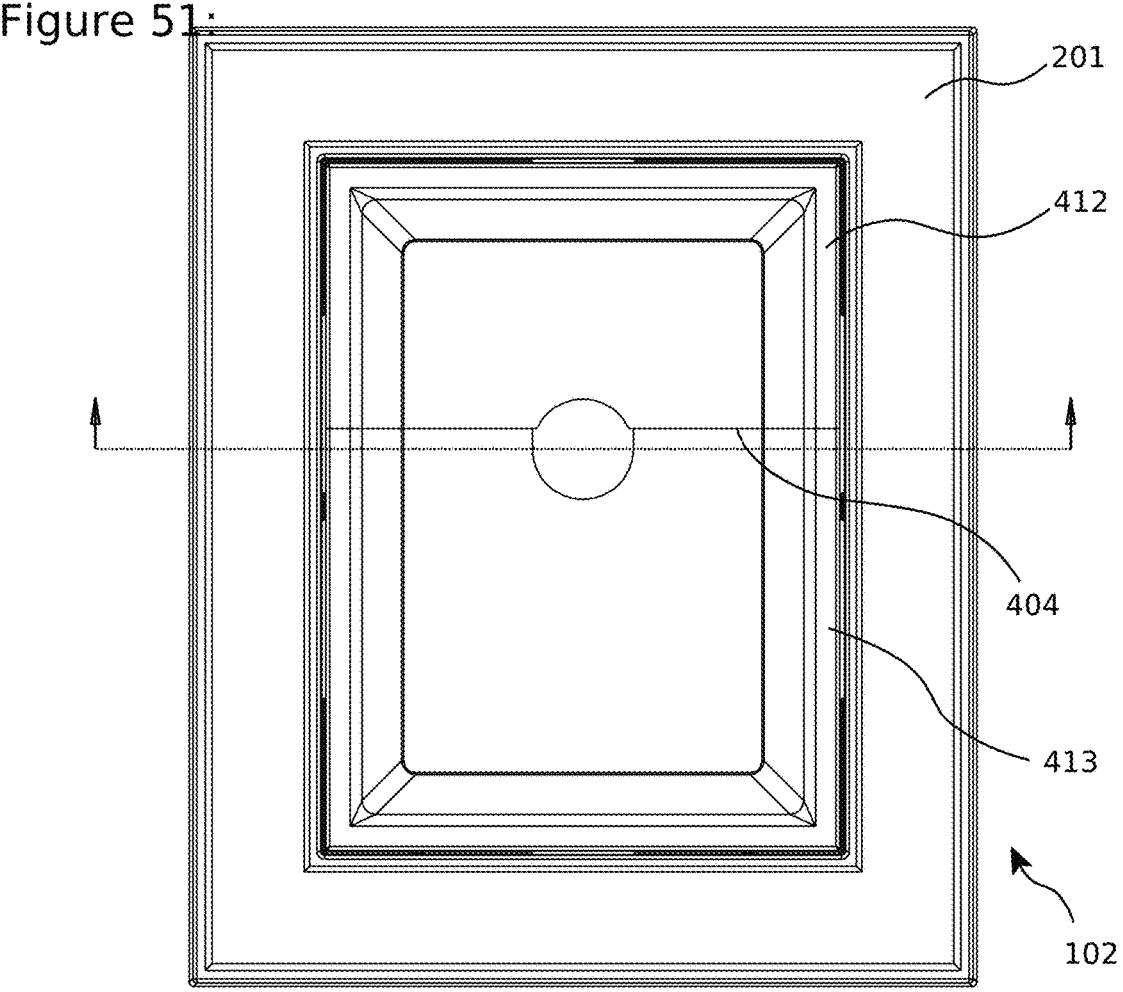
FIG. 51 schematically illustrates a split block assembly, shown from a front view, having a section line used in subsequent figures.
Figure 52:
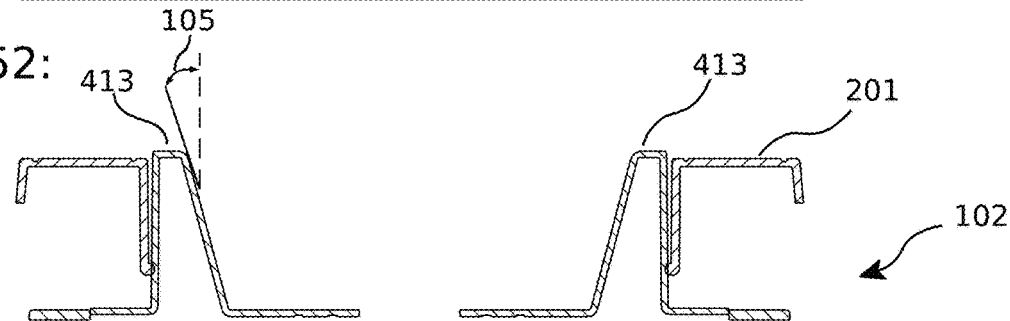
FIG. 52 schematically illustrates a split block assembly, shown with a plane intersection view.
Figure 53:
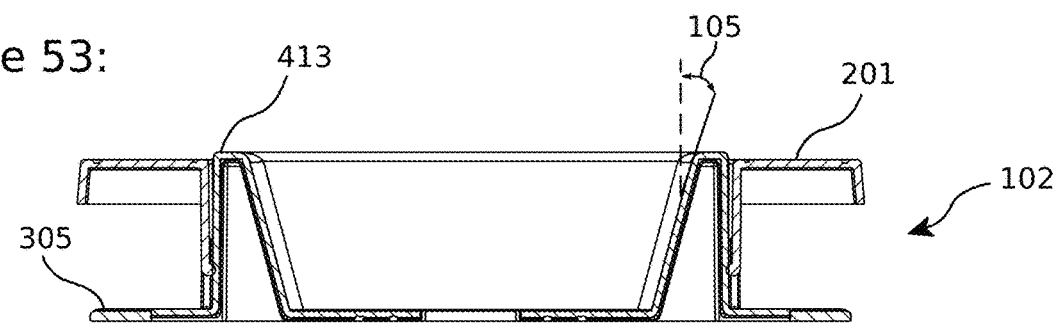
FIG. 53 schematically illustrates a split block assembly, shown with a full section view.
Figure 54:
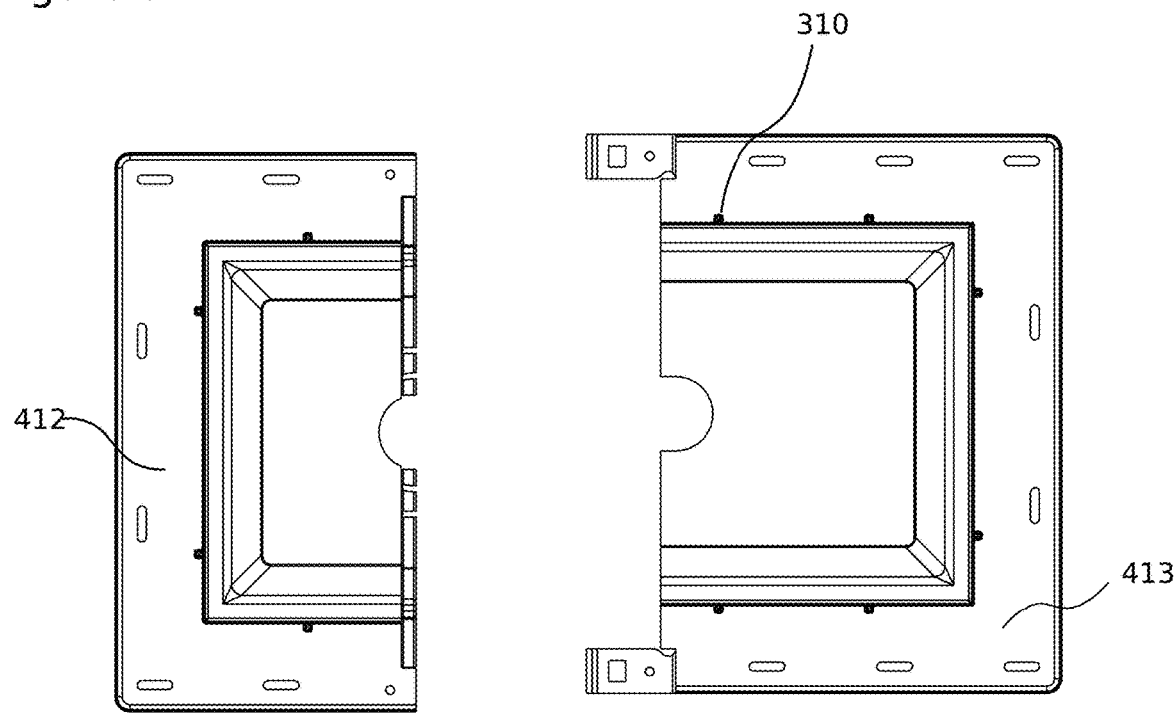
FIG. 54 schematically illustrates split block backplates, shown with an exploded top view.
Figure 55:
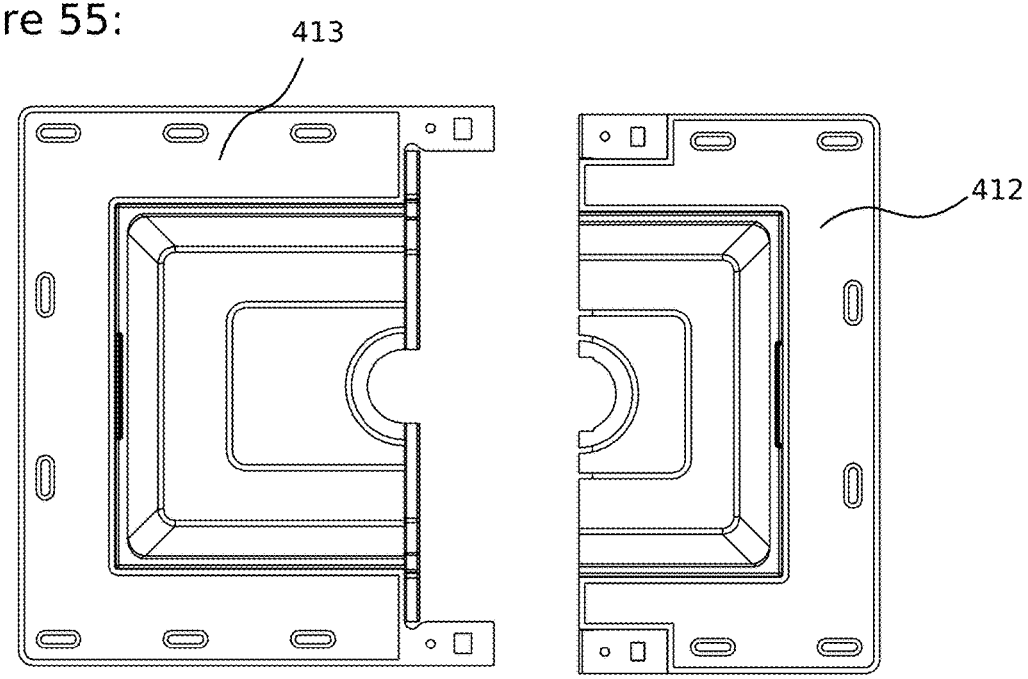
FIG. 55 schematically illustrates split block backplates, shown with an exploded bottom view.
Figure 56:
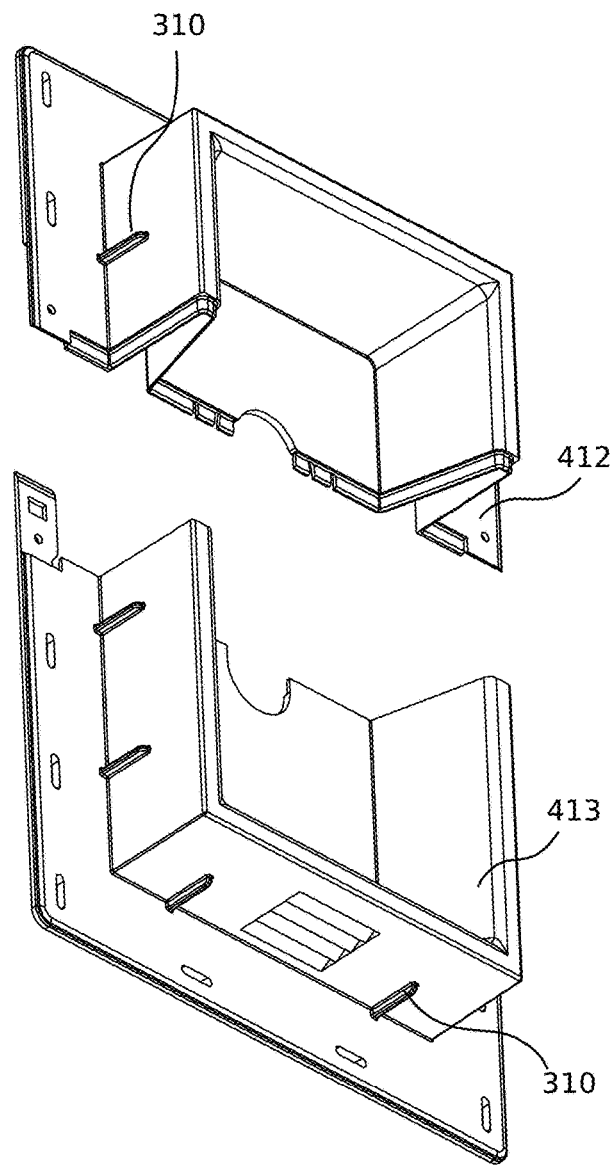
FIG. 56 schematically illustrates split block backplates, shown with an exploded isometric front view.
Figure 57:
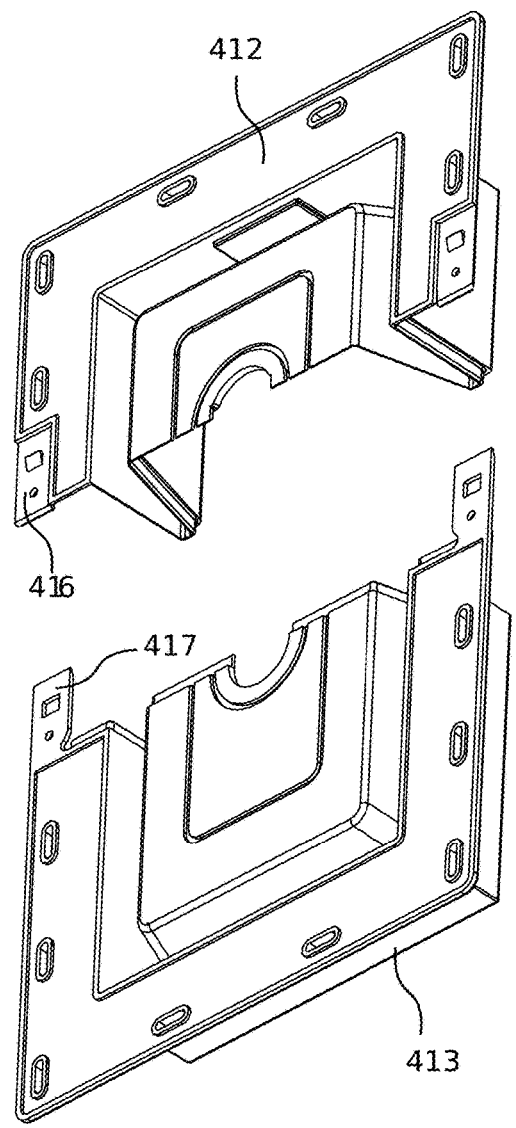
FIG. 57 schematically illustrates split block backplates, shown with an exploded isometric rear view.
Figure 58:
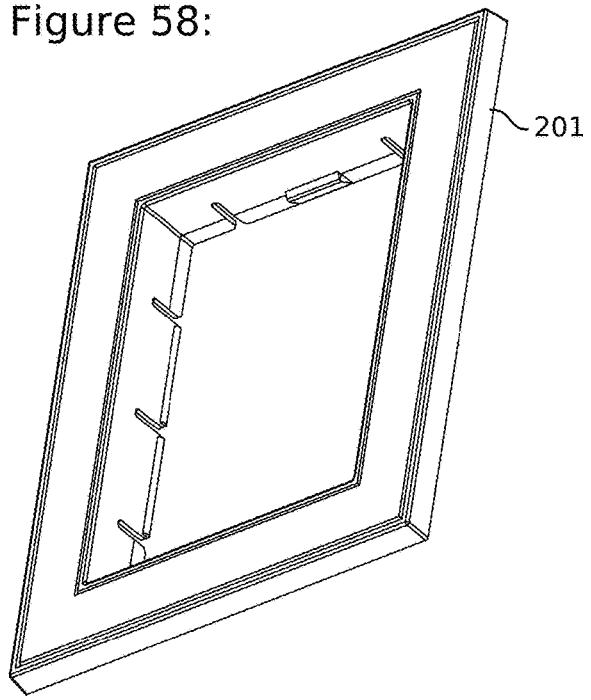
FIG. 58 schematically illustrates a snap ring, shown from a front isometric view.
Figure 59:
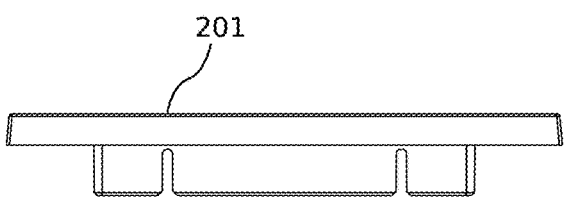
FIG. 59 schematically illustrates a snap ring, shown from a top view.
Figure 60:
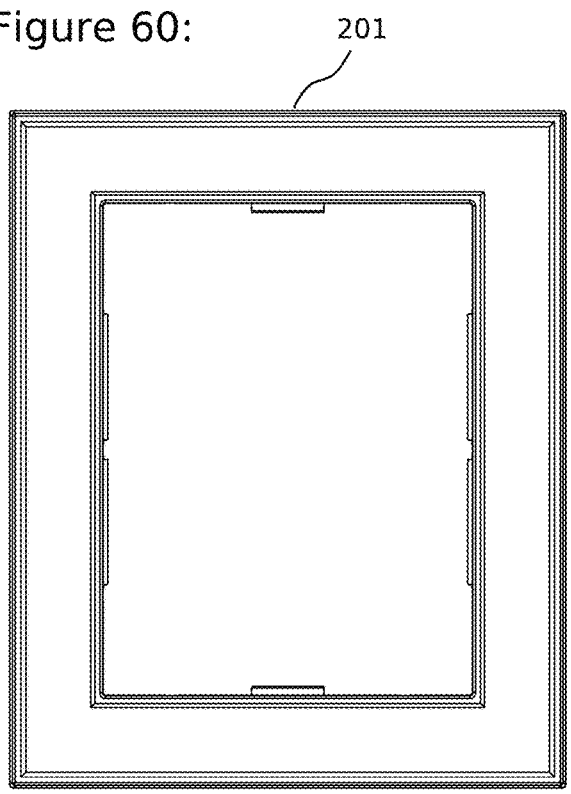
FIG. 60 schematically illustrates a snap ring, shown from a front view.
Figure 61:
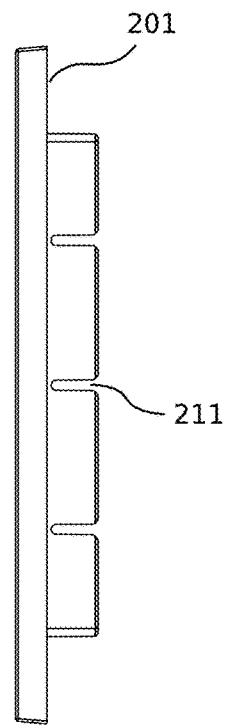
FIG. 61 schematically illustrates a snap ring, shown from a side view.
Figure 62:
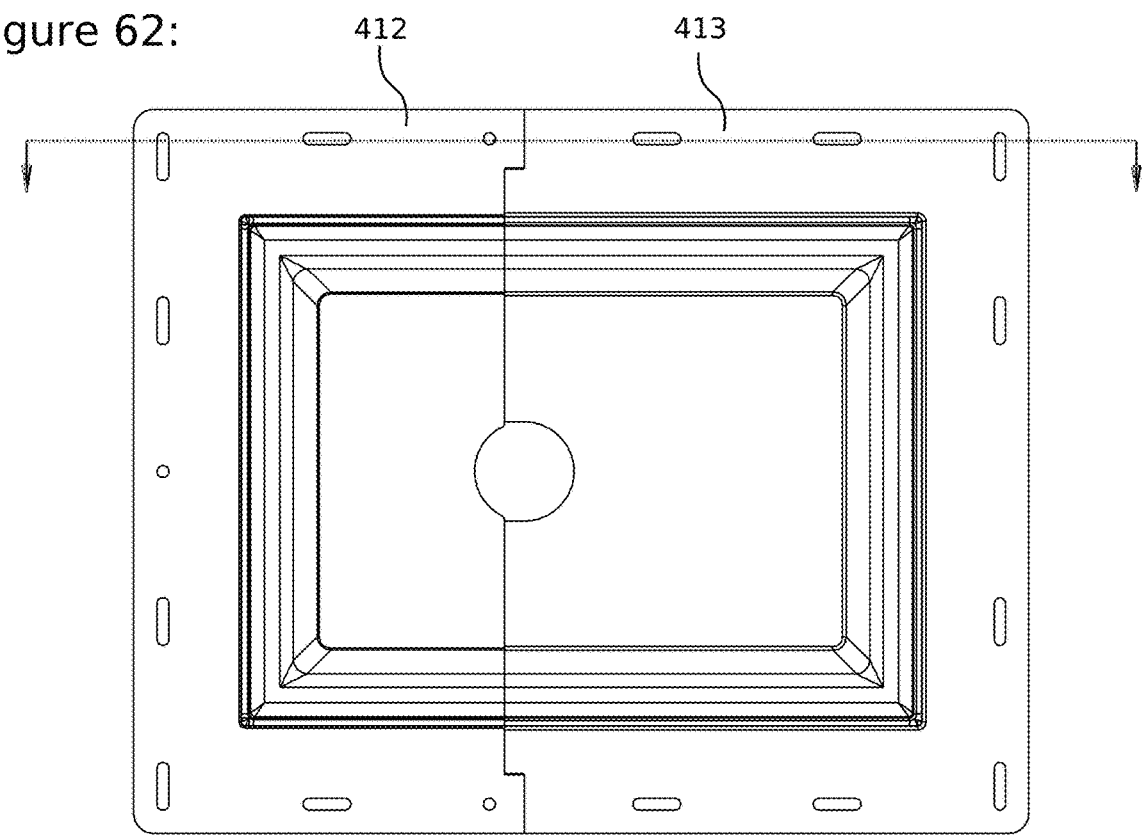
FIG. 62 schematically illustrates a split block assembly, shown from a front view, having a section line used in subsequent figures.
Figure 63:
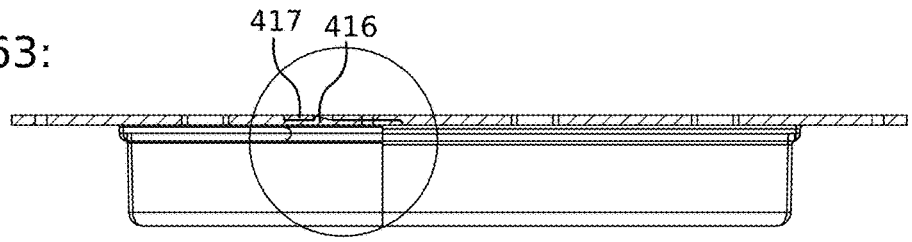
FIG. 63 schematically illustrates a split block assembly, shown with a full section view illustrating a locking feature.

As shown in FIGS. 16-26, with additional detail in FIGS. 27-34, there is illustrated a two-piece electrical box assembly (406) that consists of an electrical box face (407) and an electrical box back (408). This box can be installed into the standard block assembly (101), which may be, for example and without limitation, 5"×6". The electrical box back (408) may include several hole cutouts configured to be removed by an installer. Furthermore, the parts of the electrical box assembly (406) may have holes for attachment, via fasteners, to the mounting surface or wall, and the holes may align, as shown in FIG. 30.

There may be alternative sized block assemblies (101), including, without limitation, 6"×10". The electrical box assembly (406) includes one or more electrical box locators (409) or alignment locator slots that will help secure the electrical box assembly (406) in, for example, larger block assemblies (101) or face plate (202) assemblies. In particular, the larger block assemblies (101) may have multiple, alternative, locations for the electrical box assembly (406), such that the electrical box locators (409) fix the electrical box assembly (406) in the selected location.

The electrical box back (408) includes several electrical box snaps (414) or snap arms that interface with electrical box snap receivers (415) on the electrical box face (407). Note that the several electrical box snaps (414) and the electrical box snap receivers (415) may be moved between the respective electrical box back (408) and the electrical box face (407), and there may be mixed systems on each side. Additionally, the electrical box assembly (406) may incorporate ribs on the mounting block to guide the electrical box assembly (406) into the correct orientation or alignment, as would be recognized by those having ordinary skill in the art.

FIGS. 65-68 illustrate base plates (301) having electrical box alignment features (418). These electrical box alignment features (418) may interact or interface with the electrical box locators (409) or locator slots to align the electrical box assembly (406) within the mounting block. There may be multiple sets of electrical box alignment features (418), such that the electrical box assembly (406) may be held or placed in different locations of the base plate (301).

Those having ordinary skill in the art will also recognize that terms such as "above," "below," "upward," "downward," et cetera, are used descriptively of the figures, and do not represent limitations on the scope of the appended claims. Any numerical designations, such as "first" or "second" are illustrative only and are not intended to limit the scope of the claims in any way.

When used herein, the term "substantially" refers to relationships that are ideally perfect or complete, but where manufacturing realties prevent absolute perfection. Therefore, substantially denotes typical variance from perfection in the relevant art. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be within 5%.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting.

REFERENCE NUMBERS LIST:

General:

101. block assembly 102. split block assembly 103. vent assembly 104. mounting surface or wall Snap Ring / Face plate:

201. snap ring 202. face plate 203. front surface 204. attachment flange 205. perimeter rib 206. snap fit arm 207. snap fit tooth 208. tooth entrance side 209. tooth retraction side 210. tooth overhang depth 211. flange flex groove 213. tension rib arm 214. horizontal tension rib 216. base plate opening 217. vent Base Plate:

301. base plate 302. base plate Front surface 303. outer surface 304. snap fit receiver 305. nailing flange 306. nail slots 307. nailing flange stiffening ribs 308. nailing flange chamfer 309. score lines 310. alignment ribs Specialty (Vent/Split/electrical box features):

401. vent nail flange score line 402. vent attachment features 403. flapper 404. adjoining surface 405. vertical tension rib 406. electrical box assembly 407. electrical box face 408. electrical box back 409. electrical box locators 410. visible surface 411. curved vent lip 412. lower split base 413. upper split base 414. electrical box snaps or snap arms 415. electrical box snap receivers 416. split block arm 417. split block receiver 418. electrical box alignment feature

The invention claimed is:

1. A mounting block comprising:
 a base plate portion, wherein the base plate portion includes:
  an outer surface extending outward from a mounting surface;
 a face plate portion, selectively attachable to the base plate portion, wherein the face plate portion includes:
  an attachment flange extending toward the base plate portion;
 wherein one of the face plate portion and the base plate portion has a plurality of snap fit teeth formed thereon;
 wherein the other of the face plate portion and the base plate portion has a plurality of snap fit receivers, configured to selectively receive the snap fit teeth; and
 wherein the face plate portion further includes:
  a plurality of flange flex grooves formed in the attachment flange, allowing walls of the attachment flange to deflect independently from corners, such that the flange flex grooves allow the attachment flange to flex outward from the outer surface of the base plate portion.

2. The mounting block of claim 1, further comprising:
 wherein the base plate portion further includes:
  alignment ribs extending outward from the outer surface; and
 wherein the plurality of flange flex grooves formed in the attachment flange interface with the alignment ribs formed on the base plate portion.

3. The mounting block of claim 2, further comprising:
 one or more horizontal tension ribs formed on the attachment flange between the flange flex grooves, wherein the horizontal tension ribs apply pressure on the outer surface of the base plate portion.

4. The mounting block of claim 3, further comprising:
 one or more horizontal tension ribs formed on the attachment flange between the flange flex grooves, wherein the horizontal tension ribs apply pressure on the outer surface of the base plate portion.

5. The mounting block of claim 1, further comprising:
 wherein the snap fit teeth are formed on a snap fit arm, which is configured to deflect as it engages with the snap fit receivers.

6. The mounting block of claim 5,
 wherein the face plate portion has the snap fit receivers formed thereon; and
 wherein the base plate portion has the snap fit teeth formed thereon.

7. The mounting block of claim 1,
 wherein the base plate portion has the snap fit receivers formed thereon; and
 wherein the face plate portion has the snap fit teeth formed thereon.

8. A mounting block comprising:
 a base plate portion, wherein the base plate portion includes:
  an outer surface extending outward from a mounting surface;
 a face plate portion, selectively attachable to the base plate portion, wherein the face plate portion includes:
  an attachment flange extending toward the base plate portion;
 wherein one of the face plate portion and the base plate portion has a plurality of snap fit teeth formed thereon;
 wherein the other of the face plate portion and the base plate portion has a plurality of snap fit receivers, configured to selectively receive the snap fit teeth;
 wherein the base plate portion further includes:
  alignment ribs extending outward from the outer surface; and
 wherein the face plate portion further includes:
  a plurality of flange flex grooves formed in the attachment flange, wherein the flange flex grooves interface with the alignment ribs formed on the base plate portion.

9. The mounting block of claim 8, further comprising:
 a plurality of electrical box alignment features formed on the base plate portion, designed to accept and position an electrical box.

10. The mounting block of claim 9, further comprising:
 a plurality of alignment locator slots formed on the electrical box, wherein the electrical box alignment features interface with the alignment locator slots to hold the electrical box; and
 wherein there are multiple electrical box alignment features on the base plate portion, such that the electrical box may be held in different locations of the base plate portion.

11. A mounting block comprising:
 a base plate portion, wherein the base plate portion includes:
  an outer surface extending outward from a mounting surface;
 a face plate portion, selectively attachable to the base plate portion, wherein the face plate portion includes:
  an attachment flange extending toward the base plate portion;
 wherein one of the face plate portion and the base plate portion has a plurality of snap fit teeth formed thereon;
 wherein the other of the face plate portion and the base plate portion has a plurality of snap fit receivers, configured to selectively receive the snap fit teeth; and
 wherein the base plate portion is split into two portions, a lower split base and an upper split base;
 wherein the lower split base and the upper split base have a high draft angle, such that painting of the mounting block is improved;
 wherein one of the lower split base and the upper split base includes a split block arm, which is a substantially planar split block arm, having a tooth thereon; and
 wherein the other of the lower split base and the upper split base includes a split block receiver, having a slot configured to receive the tooth of the split block arm.

\* \* \* \* \*